(12) United States Patent
Stewart et al.

(10) Patent No.: US 12,205,810 B2
(45) Date of Patent: Jan. 21, 2025

(54) ION GUIDE

(71) Applicant: Thermo Fisher Scientific (Bremen) GmbH, Bremen (DE)

(72) Inventors: Hamish Stewart, Bremen (DE); Alexander Wagner, Bremen (DE); Alexander A. Makarov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 18/352,750

(22) Filed: Jul. 14, 2023

(65) Prior Publication Data

US 2023/0377868 A1  Nov. 23, 2023

Related U.S. Application Data

(60) Division of application No. 17/828,244, filed on May 31, 2022, now Pat. No. 11,749,516, which is a
(Continued)

(30) Foreign Application Priority Data

May 17, 2018 (GB) ...................................... 1808045
May 17, 2018 (GB) ...................................... 1808047
(Continued)

(51) Int. Cl.
*H01J 49/00* (2006.01)
*G01N 27/622* (2021.01)
(Continued)

(52) U.S. Cl.
CPC .......... *H01J 49/068* (2013.01); *G01N 27/622* (2013.01); *H01J 49/061* (2013.01);
(Continued)

(58) Field of Classification Search
CPC ...... H01J 49/068; H01J 49/061; H01J 49/065; H01J 49/36; H01J 49/4215; H01J 49/063; H01J 49/26; G01N 27/622
(Continued)

(56) References Cited

U.S. PATENT DOCUMENTS 5,811,820 A * 9/1998 Kirchner ............... C23C 14/221
427/523
7,391,021 B2 * 6/2008 Stoermer ............. H01J 49/065
250/292

(Continued)

FOREIGN PATENT DOCUMENTS

CN 102214542 A 10/2011
CN 104170053 A 11/2014
(Continued)

*Primary Examiner* — Michael Maskell

(57) ABSTRACT

An ion guide may comprise a set of plate electrodes, each plate electrode having a plurality of apertures formed therethrough. The set of plate electrodes are spatially arranged such that a relative positioning of each plurality of apertures of a respective plate electrode of the set of plate electrodes and respective adjacent plate electrodes of the set of plate electrodes defines a continuous ion flight path through the respective plurality of apertures of each plate electrode of the set of plate electrodes. The continuous ion flight path has a helical-based and/or spiral-based shape.

19 Claims, 14 Drawing Sheets

Related U.S. Application Data continuation of application No. 16/413,463, filed on May 15, 2019, now Pat. No. 11,373,850.

(30) Foreign Application Priority Data

May 17, 2018 (GB) ..................................... 1808048
May 9, 2019 (GB) ..................................... 1906557

(51) Int. Cl.
H01J 49/06 (2006.01)
H01J 49/36 (2006.01)
H01J 49/42 (2006.01)

(52) U.S. Cl.
CPC ............ *H01J 49/065* (2013.01); *H01J 49/36* (2013.01); *H01J 49/4215* (2013.01)

(58) Field of Classification Search
USPC .............. 250/281, 282, 291, 396 R, 396 ML
See application file for complete search history.

(56) References Cited

U.S. PATENT DOCUMENTS

| | | | | |
|---|---|---|---|---|
| 8,507,848 B1* | 8/2013 | Ding | ..................... | H01J 49/065 |
| | | | | 250/284 |
| 8,552,366 B2* | 10/2013 | Hoyes | ................... | H01J 49/062 |
| | | | | 250/287 |
| 9,123,518 B2* | 9/2015 | Giles | ....................... | H01J 49/26 |
| 9,552,969 B2* | 1/2017 | Giles | ..................... | H01J 49/062 |
| 9,865,442 B2* | 1/2018 | Giles | ....................... | H01J 49/26 |
| 9,984,861 B2* | 5/2018 | Giles | ..................... | H01J 49/062 |
| 2007/0194223 A1 | 8/2007 | Sato et al. | | |
| 2009/0173880 A1* | 7/2009 | Bateman | ............... | H01J 49/065 |
| | | | | 250/282 |
| 2010/0193678 A1 | 8/2010 | Clemmer et al. | | |
| 2011/0168882 A1* | 7/2011 | Hoyes | ..................... | H01J 49/42 |
| | | | | 250/281 |
| 2012/0018631 A1 | 1/2012 | Giles et al. | | |
| 2013/0187044 A1 | 7/2013 | Ding et al. | | |
| 2014/0042315 A1* | 2/2014 | Baykut | ................ | G01N 27/622 |
| | | | | 250/281 |
| 2015/0069262 A1 | 3/2015 | Welkie | | |
| 2015/0206731 A1* | 7/2015 | Zhang | .................. | H01J 49/066 |
| | | | | 250/396 R |
| 2016/0126074 A1* | 5/2016 | Green | ................. | H01J 49/0009 |
| | | | | 250/285 |

FOREIGN PATENT DOCUMENTS

| | | |
|---|---|---|
| CN | 104851733 A | 8/2015 |
| DE | 112005001175 T5 | 4/2007 |
| EP | 2131386 A1 | 12/2009 |
| EP | 2866247 A1 | 4/2015 |
| GB | 2447330 A | 9/2008 |
| GB | 2455171 A | 6/2009 |
| GB | 2464592 A | 4/2010 |
| GB | 2507618 A | 5/2014 |
| JP | 2007311111 A | 11/2007 |
| WO | WO-2005067000 A2 | 7/2005 |

\* cited by examiner

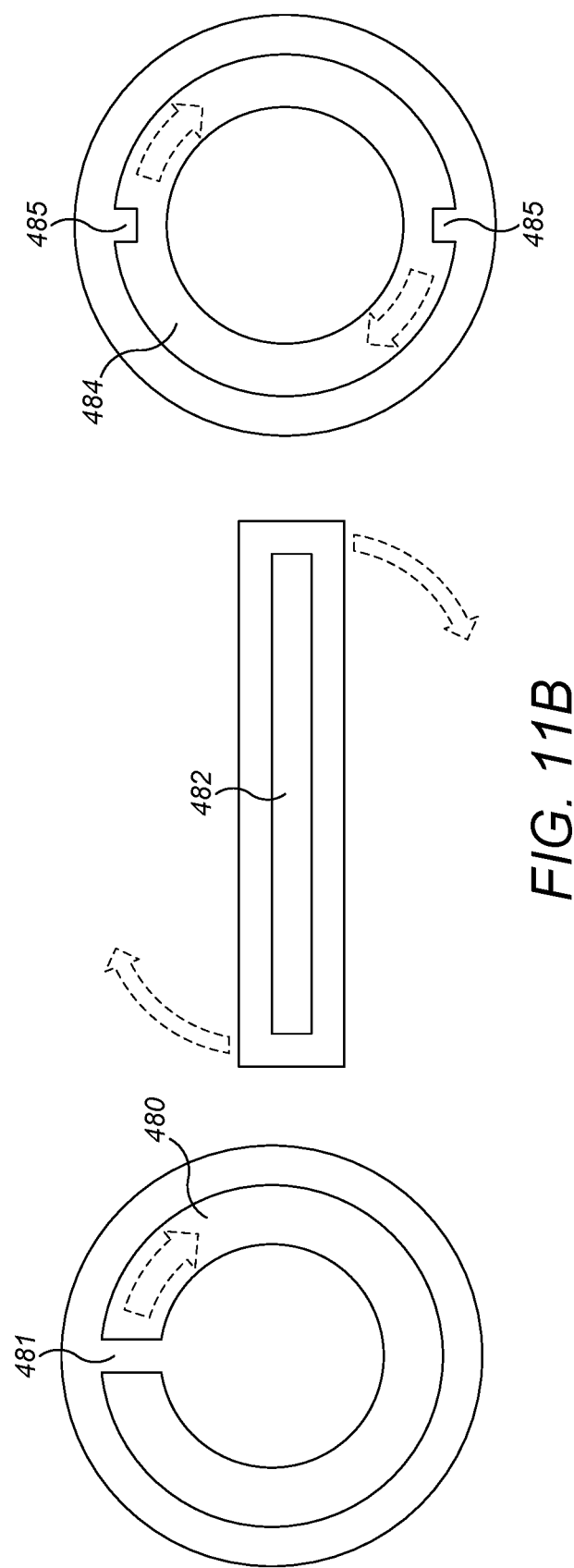

ION GUIDE

CROSS-REFERENCE TO RELATED APPLICATIONS

The present application is a division of U.S. patent application Ser. No. 17/828,244, filed May 31, 2022, which is a continuation under 35 U.S.C. § 120 and claims the priority benefit of co-pending U.S. patent application Ser. No. 16/413,463, filed May 15, 2019 and now U.S. Pat. No. 11,373,850. The disclosure of each of the foregoing applications is incorporated herein by reference.

TECHNICAL FIELD OF THE DISCLOSURE

The disclosure concerns ion guides, especially for use in an ion mobility spectrometer or a mass spectrometer.

BACKGROUND TO THE DISCLOSURE

Ion guides are used in a variety of applications, in both mass spectrometry and ion mobility spectrometry (IMS). In IMS, ions are pushed down a gas filled drift tube by an electric field and separate spatially according to their ion mobilities. The resolution of an IMS device increases with the length of the drift region, but very long devices are unsuited to commercial instrumentation, due to their size. It is therefore advantageous to fold the drift path into a more compact structure, conceptually similar to multi-turn time-of-flight mass spectrometers. The use of IMS in a mass spectrometer is described in Patent Publication No. 2004/031920, for example.

US Patent Publication No. 2011/0168882 discusses an ion guide or ion mobility spectrometer having a helical, toroidal, part-toroidal, hemitoroidal, semitoroidal or spiral ion guiding region. The ion guide comprises a plurality of stacked electrodes each having an aperture through which ions are transmitted. A RF voltage is applied to the electrodes in order to confine ions radially within the ion guide. A DC or transient DC voltage is applied to at least some of the electrodes in order to urge ions along the ion guide. The number of electrodes required for such a design is proportional to the length of the ion guide. This is consequently a difficult and expensive design to manufacture and could have a high chance of electrical failure, due to the large number of electrical connections required.

US Patent Publication 2014/0353487 describes a different IMS method that sends ions multiple times around a closed loop. This is space-efficient, but has a low duty cycle and limitations in its ion mobility range or resolution, as higher ion mobility ions could eventually catch up with lower ion mobility ions in the closed loop.

US Patent Publication 2014/0042315 relates to measuring ion mobility in gases at pressures of a few hectopascal. Drift regions are bent into curved shapes, which extend into a third dimension. Alternating directions of curvature in the curved shapes (that is, both clockwise and anticlockwise curvature) balance out different path lengths by passing through approximately equal drift distances on outer and inner trajectories. The different path lengths would otherwise result in a loss of resolution. Ions are held near the axis of the curved drift region by sectional or permanent focusing, so that the average drift path is constant. One possible shape is a double loop in the shape of a figure eight. The shape extends perpendicular to its plane of projection, so that several double loops lie on top of each other. Whilst such an arrangement may have its advantages, it is still complex to manufacture. Moreover, it would be expected that ions move back and forth between inner and outer edges as they travel, so the practical impact of this design might be less than originally envisaged.

Japanese Patent Publication 2007/311111 describes a Time-of-Flight (TOF) mass spectrometer formed using an inner metal plate and an outer metal plate, which define a spiral ion flight path. A shunt is provided between the inner metal plate and the outer metal plate to prevent beam interactions. This arrangement is also described in "A New Spiral Time-of-Flight Mass Spectrometer for High Mass Analysis", Satoh et al, J. Mass Spectrom. Soc. Jpn. Vol. 54, No. 1, 2006.

Ion guide designs, suitable for use in IMS, which are more straightforward to manufacture, more robust and can provide high resolution performance are therefore desirable.

SUMMARY OF THE INVENTION

There is provided: ion guides; an ion mobility spectrometer; and a mass spectrometer. Further features of the invention are detailed in dependent claims and discussed herein.

An ion guide in a first aspect comprises a set of electrodes, which are each a plate electrode or an electrode structure that functionally mimics a plate electrode (at least one example of which will be discussed below). For simplicity, the term "plate electrode" will be used to cover all such electrode structures. Multiple apertures are formed through each of the plate electrodes. The set of plate electrodes (each having a plurality of apertures) are spatially arranged (or mounted) such that a relative positioning of the plurality of apertures of each plate electrode and the apertures of its adjacent plate electrodes defines a continuous ion flight path through the multiple apertures of each of the set of plate electrode.

A single continuous ion flight path may thereby be provided through the multiple apertures of each of the set of plate electrode. It is preferred that the plate electrodes are arranged consecutively, that is in a stack, such that an $n^{th}$ plate electrode is adjacent to an (n+1)th plate electrode, where n=1 to N−1, wherein N is the total number of plate electrodes. Further preferably, the $N^{th}$ plate electrode is adjacent to the first (n=1) plate electrode, that is such that the last electrode ($N^{th}$) meets the first electrode. Thereby the plate electrodes are arranged in a curved stack. The number of plate electrodes may be as few as 30 and as high as 180.

In some embodiments, at least some of the set of plate electrodes are spatially arranged around an axis that extends in an axial dimension, for example in a circle or circular arrangement around the axis, although other arrangements are possible as described below, such as oval, rounded rectangular, or labyrinthine. In this way, the continuous ion flight path rotates around the axis that extends in the axial dimension. The axis thus becomes an axis of rotation for the ion flight path. In this way, the continuous ion flight path has a spiral, spiral-like, helical or helical-like shape (or a combination thereof), as described further below. Where a spiral, spiral-like or spiral-based shape is discussed, this may refer to a shape having a fundamental spiral character, for instance a curve with a generally increasing (or decreasing) radius from a central point or line. A helical, helical-like or helical-based shape may refer to a shape having a fundamental helical character, for instance a curve extending along an axis and having a generally repeating shape. These terms will be further discussed below.

Preferably, each plate electrode of the set of plate electrodes has the respective plurality of apertures spaced apart along a first dimension. In some embodiments, the first dimension is the same as the axial dimension (that is, generally parallel with the axis). By such an arrangement, the continuous ion flight path has a helical character. In other embodiments, the first dimension is perpendicular to the axial dimension. Then, the continuous ion flight path has a spiral character (although it may also have a helical character, as will be discussed further). The apertures are spaced apart along the first dimension by an aperture spacing. Preferably, each electrode has the same spacing of apertures along the first dimension. Further preferably, a respective plate electrode of the set of plate electrodes has its respective plurality of apertures positioned so as to be offset in the first dimension from the respective plurality of apertures of a respective adjacent plate electrode. Where the first dimension is perpendicular to the axial dimension (such that a spiral continuous ion flight path is formed), the offset may be in both the first dimension and the axial dimension. Then, the continuous ion flight path has both a spiral and helical character.

To achieve this, in some embodiments, the respective adjacent plate electrodes of the set of plate electrodes are positioned so as to be offset from one another in the first dimension, especially wherein the plate electrodes are substantially identical. In some other embodiments, less preferred from a manufacturing perspective, an offset of the apertures may be defined by a variation in the position of the apertures on each plate electrode.

The offset is preferably less than the aperture spacing. In this way, the continuous ion flight path extends slightly (that is, less than the aperture spacing within each electrode) in the first dimension as it passes from a respective plate electrode to a respective adjacent plate electrode. Preferably, for a full rotation of the continuous ion flight path, that is, after passing through each plate electrode, the ion flight path extends in the first dimension by an amount equal to the aperture spacing. This is preferable for example, in the embodiments where the last electrode ($N^{th}$) meets the first electrode. Accordingly, it is preferred that the offset is substantially equal to y/N, where y is the aperture spacing within each plate electrode and N is the number of plate electrodes. Thus, in some preferred embodiments, after the continuous ion flight path has passed through every respective first aperture of each plate electrode, the continuous ion flight path commences to pass through a respective second aperture of each plate electrode, thereafter optionally through a respective third aperture of each plate electrode and so on. Generally, where the plate electrodes each have x apertures (x is at least 2, preferably 2 to 100, more preferably 3 to 100), the continuous ion flight path will pass x times through each plate electrode, passing through the apertures of each plate electrode in sequence.

In contrast with known ion guide structures, this design can provide high IMS resolution in a reasonably compact device, but requires many fewer electrodes (and other components) and electrical connections to achieve a flight path of the same length, since different parts (apertures) of each electrode provide different portions of a single flight path. The difference may be an order of magnitude. Between 5 and 100 apertures per electrode may be provided, in embodiments. Using fewer electrodes makes the structure more electrically robust and eases manufacture, reducing cost. Accuracy may also be improved. In comparison with closed-loop flight path designs, a higher duty cycle can be achieved. In closed-loop ion guide structures (such as US-2014/0353487), it is possible for some ions to complete more cycles of the closed-loop flight path than others. This disadvantage is not present in embodiments of the present disclosure, providing a greater ion mobility range that is preserved at high resolution.

Where the ion flight path has a helical shape, this is not necessarily helical in a mathematical sense. The helical shape is thus intended to mean helical-like, which includes helical, substantially helical or other shapes having an aspect of helical character, examples of which are described herein. Similarly, a spiral shape is not necessarily spiral in a mathematical sense and may mean spiral-like, which includes substantially spiral or other shapes having an aspect of spiral character, examples of which are described herein. A wide variety of spiral-like and helical-like shapes for the ion flight path are possible with this design. The helical shape can define a two-dimensional profile and typically, the defined ion flight path extends multiple times along the two-dimensional profile as it extends in the first dimension, which is generally perpendicular to the two-dimensional profile. The two-dimensional profile may be circular, oval, rounded rectangular, labyrinthine or figure-of-eight, for instance. A figure-of-eight two dimensional profile (or more generally, one with both clockwise and anticlockwise curvature) may be provided using first and second pluralities of electrodes, each of which is arranged to define a circular two-dimensional profile. Thus, the first plurality of electrodes may be arranged around a first axis and the second plurality of electrodes may be arranged around a second axis, wherein both first and second axes extend in the first dimension along which the plurality of apertures of each plate electrode are spaced apart. Some of the first plurality of electrodes and some of the second plurality of electrodes are arranged to interleave with one another, such that the two-dimensional profile of the first plurality of electrodes overlaps with the two-dimensional profile of the second plurality of electrodes. Then, the continuous ion flight path can be defined by the apertures of both the first and second pluralities of electrodes. The interleaving electrodes may be provided with alternating parts with an aperture and gaps (or notches), such that the part with an aperture of one of the first plurality of electrodes fits into the gap part of a corresponding one of the second plurality of electrodes (and vice versa).

Each plate electrode may have one or more of the same: shape; size; and positioning and/or spacing of apertures. Where identical plate electrodes are used, they are typically offset from each other along the axis of the helical shape. The offset between one plate electrode and an adjacent plate electrode is preferably less than the spacing of apertures within a plate electrode. The offset between one plate electrode and an adjacent plate electrode is thus preferably arranged such that after each complete rotation, the $p^{th}$ aperture of the last electrode ($N^{th}$) is adjacent the $(p+1)^{th}$ aperture of the first electrode in the sequence ($1 \leq p < x-1$, where x is the number of apertures in each electrode). In some embodiments, each of the apertures of each plate electrode has a rectangular or ovoid shape. It is not necessary for all of the apertures to have the same shape or arrangement and designs utilising this approach will be discussed with reference to an ion guide of a second aspect, below.

For radial ion confinement, an RF power supply may provide each plate electrode with a respective RF voltage, especially such that adjacent electrodes receive RF voltages with different phases. In particular, a first RF voltage may be applied to every second plate electrode as spatially arranged and to provide a second RF voltage (having opposite phase to the first RF voltage) to every second plate electrode of the set of electrodes not receiving the first RF voltage. A DC power supply may supply at least one DC potential to one or more electrodes of the set of electrodes, particularly to form a travelling wave, so as to cause ions to travel through the defined ion flight path.

Each RF voltage may have an amplitude selected from: (i) <100 V peak to peak; (ii) 100-200 V peak to peak; (iii) 200-300 V peak to peak; (iv) 300-400 V peak to peak; (v) 400-500 V peak to peak; and (vi) >500 V peak to peak. Each RF voltage may have a frequency selected from: (i) <100 kHz; (ii) 100-500 kHz; (iii) 0.5-1.0 MHz; (iv) 1.0-1.5 MHz; (v) 1.5-2.0 MHz; (vi) 2.0-2.5 MHz; (vii) 2.5-3.0 MHz; (viii) 3.0-4.0 MHz; (ix) 4.0-5.0 MHz; (x) 5.0-6.0 MHz; (xi) 6.0-7.0 MHz; (xii) 7.0-8.0 MHz; (xiii) 8.0-9.0 MHz; (xiv) 9.0-10.0 MHz; and (xv) >10.0 MHz. The DC travelling wave voltages or waveforms are preferably translated along the set of electrodes of the ion guide at a velocity selected from: (i) <100 m/s; (ii) 100-500 m/s; (iii) 500-1000 m/s; (iv) 1000-1500 m/s; (v) 1500-2000 m/s; (vi) 2000-2500 m/s; (vii) 2500-3000 m/s; (viii) >3000 m/s.

A mounting element, on which the set of electrodes are mounted, may be provided in order to set the relative positioning of apertures between adjacent electrodes of the set of electrodes. The mounting element (for example, a printed circuit board) may comprise one or more electrical connections to the set of electrodes.

In some embodiments, the mounting element comprises: a first mounting substrate, to which a first end of each electrode of the set of electrodes is attached; and a second mounting substrate (opposite the first mounting substrate), to which a second end of each electrode of the set of electrodes is attached. The first and second mounting substrates may thereby be spaced apart from each other along the first dimension, that is, the direction in which the apertures are spaced apart within each plate electrode, with the plate electrodes sandwiched between. The first mounting substrate may comprise one or more first electrical connections to every second plate electrode of the set of electrodes as spatially arranged. The second mounting substrate may comprise one or more second electrical connections to every second plate electrode of the set of electrodes between the electrodes connected to the one or more first electrical connections. The second electrical connections may be arranged to provide an electrical power that is different from an electrical power provided by the first electrical connections, for example the first and second RF voltages and/or the at least one DC potential described above. The first and second mounting substrates may each comprise a printed circuit board (PCB), which is convenient for providing the electrical connections. Furthermore, the PCB is preferably flexible enough to be bent into a desired shape. In some embodiments, the PCB may comprise a substantially helical form. In such embodiments, preferably the PCB comprises a ring shape having a cut in which the two ends of the PCB adjacent the cut are spaced apart. The ends may be spaced apart by a distance that is substantially equal to the aperture spacing within each plate electrode. A spacer may be provided between the cut ends of the PCB for this purpose.

The mounting element may comprise a mounting substrate. In certain embodiments, each electrode of the set of electrodes is attached to the mounting substrate, which has a shape to thereby set the relative positioning of apertures between adjacent electrodes of the set of electrodes. In other embodiments, the mounting element further comprises a spacer, positioned between the mounting substrate and the set of electrodes. The spacer may be configured to set the relative positioning of apertures between adjacent electrodes of the set of electrodes.

An ion guide of a second aspect comprises a plurality of electrodes, each electrode comprising at least one aperture, so as to define an ion flight path (preferably curved). This aspect may be combined with the first aspect, in which case, each electrode may be a plate electrode (or a structure functionally mimicking a plate electrode), having multiple apertures and the ion flight path may have a helical shape. In this second aspect, an aperture of a first electrode is advantageously adjacent to an aperture of a second electrode along the ion flight path. The aperture of the second electrode has a shape, electric potential and/or position different from that of the aperture of the first electrode so as to cause ions travelling along the ion flight path to shift in a direction perpendicular to the direction of the ion flight path. Advantageously, the ion flight path has at least one curve. In this approach, the ions may be caused to travel along different parts of the curvature of the same path, which may mitigate path length difference effects. This should reduce resolution loss (or increase any limit on resolution) in comparison with wider apertures or smaller helical radii, allowing good resolution on smaller devices or devices with higher space charge capacity. In another sense, it may be considered that the at least one curve defines an average radius of curvature. Then, the ions may be caused to oscillate between inside the average radius of curvature and outside the average radius of curvature. As a consequence, a difference in flight path length between ions entering the ion guide at a position inside the average radius of curvature and ions entering the ion guide at a position outside the average radius of curvature may be corrected.

Beneficially, the direction perpendicular to the direction of the ion flight path may defined by a (further) helical shape, the direction of the ion flight path being an axis of the (further) helical shape. In the combination of the first and second aspects, the ions may thereby travel along a helical path that is perpendicular to the helical shape.

One way to provide this effect is by each of the aperture of the first electrode and the aperture of the second electrode comprising a respective first slot and a respective second slot, each first slot being distinct and separated from the respective second slot. The first slot of the aperture of the second electrode may have a shape and/or position different from the first slot of the aperture of the first electrode, so as to cause ions travelling along the ion flight path to shift in a first direction perpendicular to the direction of the ion flight path. Additionally (and less preferably, alternatively), the second slot of the aperture of the second electrode has a shape and/or position different from the second slot of the aperture of the first electrode, so as to cause ions travelling along the ion flight path to shift in a second direction perpendicular to the direction of the ion flight path. The first and second directions are typically the same in a rotational sense (for example, both clockwise or both anti-clockwise). Each first slot and each second slot may have a shape defined by respective portions of the same rectangle.

A third aspect of an ion guide (which can again be combined with either or both of the first and second aspects), comprises: a first plurality of electrode arrangements, each electrode arrangement comprising respective parallel bar electrodes, with a respective gap therebetween; and a second plurality of electrode arrangements, each electrode arrangement comprising respective parallel electrode parts, with a respective gap therebetween. The parallel electrode parts of the second plurality of electrode arrangements are arranged orthogonally with respect to the parallel bar electrodes of the first plurality of electrode arrangements (for example, with the bar electrodes being arranged horizontally and the parallel electrode parts of the second plurality of electrode arrangements being arranged vertically). This may be effected such that the respective gaps of the first plurality of electrode arrangements are aligned with the respective gaps of the second plurality of electrode arrangements to allow ions to travel therethrough along a continuous path. The first and second pluralities of electrode arrangements are arranged alternately along the continuous path (that is, spaced apart with each first electrode arrangement being directly followed by a second electrode arrangement and each second electrode arrangement being directly followed by a first electrode arrangement, with the exception of the last electrode arrangement in the ion guide). Each of the first plurality of electrode arrangements (and optionally, each of the second plurality of electrode arrangements) is therefore not strictly a plate electrode, but rather an electrode structure that mimics a plate electrode using bar electrodes. Successive electrode arrangements in the first plurality of electrode arrangements (or in the second plurality of electrode arrangements) are preferably provided with RF potentials of different (optionally, opposite) phase. Such a structure may be a form of plate electrode used in ion guides according to the first aspect.

In certain embodiments, each of the first plurality of electrode arrangements are provided with (only) an RF potential and each of the second plurality of electrode arrangements are provided with (only) a DC potential. The potentials can be applied to the first and second pluralities of electrode arrangements in a similar manner to embodiments of the aspects described above. For example, a first RF voltage may be applied to every second electrode arrangement of the first plurality of electrode arrangements and a second RF voltage (preferably having opposite phase to the first RF voltage) to every second electrode arrangement of the first plurality of electrode arrangements not receiving the first RF voltage. A DC power supply may supply the DC potential to each of the second plurality of electrode arrangements, preferably to form a travelling wave, so as to cause ions to travel through the defined ion flight path.

Each RF voltage may have an amplitude selected from: (i) <100 V peak to peak; (ii) 100-200 V peak to peak; (iii) 200-300 V peak to peak; (iv) 300-400 V peak to peak; (v) 400-500 V peak to peak; and (vi) >500 V peak to peak. Each RF voltage may have a frequency selected from: (i) <100 kHz; (ii) 100-500 kHz; (iii) 0.5-1.0 MHz; (iv) 1.0-1.5 MHz; (v) 1.5-2.0 MHz; (vi) 2.0-2.5 MHz; (vii) 2.5-3.0 MHz; (viii) 3.0-4.0 MHz; (ix) 4.0-5.0 MHz; (x) 5.0-6.0 MHz; (xi) 6.0-7.0 MHz; (xii) 7.0-8.0 MHz; (xiii) 8.0-9.0 MHz; (xiv) 9.0-10.0 MHz; and (xv) >10.0 MHz. The DC travelling wave voltages or waveforms are preferably translated along the set of electrodes of the ion guide at a velocity selected from: (i) <100 m/s; (ii) 100-500 m/s; (iii) 500-1000 m/s; (iv) 1000-1500 m/s; (v) 1500-2000 m/s; (vi) 2000-2500 m/s; (vii) 2500-3000 m/s; (viii) >3000 m/s.

Optionally, the second plurality of electrode arrangements could comprise plate electrodes, each having an aperture to provide the respective gap.

Other aspects of the disclosure include an ion mobility spectrometer or a mass spectrometer, comprising the ion guide of any aspect. In the ion mobility spectrometer, the ion guide is advantageously configured as a drift tube. In the mass spectrometer, the ion guide may be configured to receive ions from an upstream ion source or ion optical device and to cause the received ions to travel along the ion flight path. The mass spectrometer may further comprise a mass analyser, configured to receive ions that have travelled along the ion flight path. Optionally, an ion optical bypass arrangement may be provided, configured selectively to cause ions to travel from the upstream ion source or ion optical device to the mass analyser without passing through the ion guide.

BRIEF DESCRIPTION OF THE DRAWINGS

The invention may be put into practice in a number of ways, and preferred embodiments will now be described by way of example only and with reference to the accompanying drawings, in which:

FIG. 11B illustrates a second example of electrode aperture shapes in accordance with the disclosure, suitable for ion guides.

DETAILED DESCRIPTION OF PREFERRED EMBODIMENTS

Figure 1:
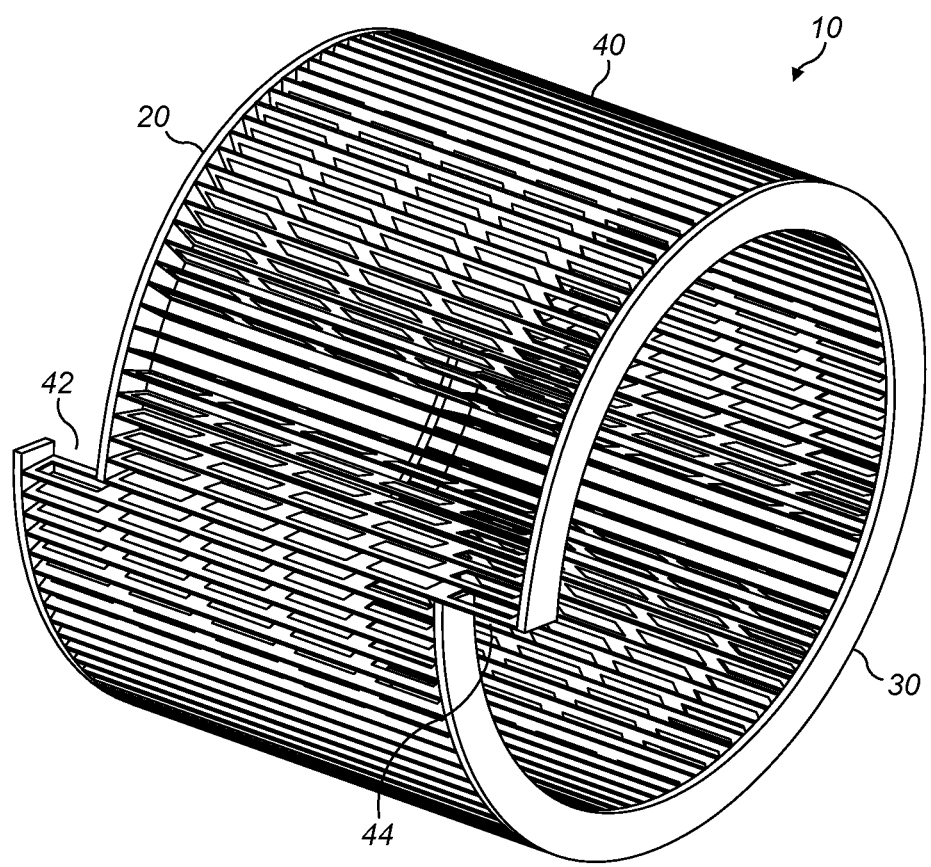
FIG. 1 is a perspective view of a first design of an ion guide in accordance with the disclosure.

A number of different ion guide designs, structures and associated manufacturing methods are described below. Although certain features are described with reference to one or more particular embodiments or designs, it will be understood that these can also be applied to other embodiments or designs disclosed herein, wherever possible. Where the same parts are shown in different drawings, identical reference numerals have been used, for clarity.

Referring first to FIG. 1, there is shown a perspective view of a first design of an ion guide 10 in accordance with the disclosure. The ion guide 10 comprises: a first mounting printed circuit board (PCB) 20; a second mounting PCB 30; and a plurality of plate electrodes 40. Each of the plate electrodes 40 is mounted between the first mounting PCB 20 and the second mounting PCB 30 (in a sandwich structure). The number of electrodes may be limited at a lower bound by the radius becoming too constricted to fit in plates (in particular, solid plates) or when the curvature between each plate becomes disruptive to the field. The upper limit on the number may be complexity and capacitance, as much as space. Between 30 and 180 plates may therefore be possible, dependent on the radius of curvature and size of the electrodes. Moreover, each of the plate electrodes 40 has a plurality of apertures; all of the plate electrodes 40 have the same size, shape and aperture arrangement. In principle, the number of apertures per plate electrode 40 could be as small as two and it could be as high as 100 (or potentially greater).

The resultant ion guide 10 can thereby more generally be seen to comprise a curved stack (in this case circular) of elongated electrodes 40, each mounted to PCB mounting substrates 20, 30 and incorporating an array of apertures so that the stack defines a series of channels. A small axial shift from one electrode to the next due to the shape of the first 20 and second 30 mounting PCBs (or alternatively in the positions of the apertures themselves) causes the channels between apertures to overlap and merge into a fused, elongated 3D ion path. The ion path has a helical shape.

In general terms, there may therefore be considered a first aspect of an ion guide. The ion guide comprises a set of plate electrodes (or electrodes that are each configured to mimic a plate electrode functionally). Each plate electrode has a plurality of apertures formed therethrough. The set of plate electrodes are spatially arranged (or mounted) such that a relative positioning of each plurality of apertures of a respective plate electrode of the set of plate electrodes and respective adjacent plate electrodes of the set of plate electrodes defines a continuous ion flight path through the respective plurality of apertures of each plate electrode of the set of plate electrodes. The continuous ion flight path advantageously has a helical-based and/or spiral-based shape (the spiral-based shape will be discussed further later in this disclosure, with reference to FIGS. 10A to 10D). The continuous ion flight path may be considered a single ion flight path, although in practice, the continuous ion flight path may be divided into multiple ion flight paths (at least one way of achieving this will be described below). In a further aspect of the disclosure, there may be considered an ion mobility spectrometer, comprising any ion guide as described herein, configured as a drift tube.

The set of plate electrodes may be considered as arranged in a sequence. Then, a first electrode in the sequence may be arranged to provide an access aperture for ions to enter the continuous ion flight path. Additionally or alternatively, a last electrode in the sequence may be arranged to provide an exit aperture for ions to leave the continuous ion flight path. Typically, the number of plate electrodes may be as low as 30 and/or as high as 180. For each plate electrode, the respective plurality of apertures comprises at least 3, 5, 10, 20, 30, 50, 70 or 80 apertures and/or preferably no more than 80, 100 or 120 apertures.

Beneficially, each plate electrode of the set of plate electrodes has the respective plurality of apertures spaced apart along a first dimension (which in some embodiments is the axis of the helical-based shape). Then, the relative positioning of each plurality of apertures may define the continuous ion flight path to extend in the first dimension. The relative positioning of each plurality of apertures may define the continuous ion flight path to extend in the first dimension. Some or all of the set of plate electrodes may be spatially arranged around an axis that extends in the first dimension. Then, the continuous ion flight path typically has a helical-based shape. The first dimension may define an axis of the ion guide in such cases.

The relative positioning of each plurality of apertures of a respective plate electrode of the set of plate electrodes and respective adjacent plate electrodes of the set of plate electrodes preferably includes spacing along the first dimension. In other words, respective adjacent plate electrodes of the set of plate electrodes are positioned so as to be offset from one another in the first dimension. This is one implementation of what is sometimes referred to as an axial shift in this disclosure. Typically, in such embodiments, each electrode of the set of electrodes has the same spacing of apertures along the first dimension. Then, the offset between the respective plurality of apertures of one plate electrode of the set of plate electrodes and the respective plurality of apertures of one adjacent plate electrode of the set of plate electrodes is beneficially less than the spacing of apertures. For instance, the offset between respective pluralities of apertures of respective adjacent plate electrodes may be substantially equal to y/N, where y is the aperture spacing within each plate electrode and N is the number of plate electrodes. Then, an offset between one plate electrode of the set of plate electrodes (which may be termed a last of the set of plate electrodes arranged in a sequence) and one adjacent plate electrode of the set of plate electrodes (which may be termed as a first of the set of plate electrodes in the sequence) is advantageously substantially equal to the spacing of apertures (that is y).

Further optional, preferable and advantageous features of this generalised aspect, also applying to its specific embodiments, will be discussed below. Firstly, manufacturing details of the design according to this aspect will be detailed.

Figure 2:
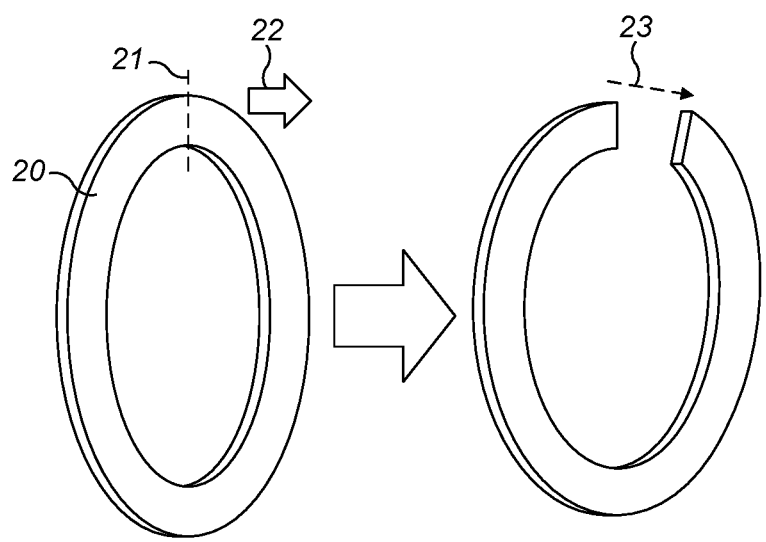
FIG. 2 shows a manufacture step of a mounting substrate according to a first design, for the ion guide of FIG. 1.

Now referring to FIG. 2, there is shown a manufacture step of a mounting substrate, for the ion guide of FIG. 1. For simplicity, the first mounting PCB 20 is shown, but it will be understood that this technique is also applicable to the second mounting PCB 30. The PCB 20 is initially a ring, which is cut at 21 and then bent or pushed 22 to create a helical form, with the gap 23 between the cut (terminal) ends of the PCB being flexed to a specific size. Provided that the PCB 20 is sufficiently flexible, the helical form can be a single rotation and with a fixed shape, by mounting the back of the PCBs to a plate incorporating this axial shift, or placing a spacer between the cut ends of each PCB 20, 30.

The axial shift over the rotation of the PCB 20, 30 (in other words, the helical form of the PCB as shown in FIG. 2) induces the same axial shift in the stacked ring of electrodes 40 forming the ion guide 10. As a result, if this axial shift corresponds to the spacing of the apertures within each electrode along the first dimension, the apertures merge to form a single fused helical ion channel with an inlet aperture 42 and an outlet aperture 44.

In terms of the generalised aspect of the ion guide discussed above, the ion guide may further comprise a mounting element, on which the set of electrodes are mounted in order to set the relative positioning of apertures between adjacent electrodes of the set of electrodes. The mounting element may comprise a plurality of component parts in an integral or separable structure. Advantageously, the mounting element comprises one or more electrical connections to the set of electrodes. The mounting element may comprise one or more PCBs.

In one embodiment, the mounting element comprises: a first mounting substrate, to which a first end of each electrode of the set of electrodes is attached; and a second mounting substrate, to which a second end of each electrode of the set of electrodes is attached. Each of the first and second mounting substrate may comprise (or be) a respective PCB. Preferably, the first mounting substrate comprises one or more first electrical connections to every second electrode of the set of electrodes as spatially arranged. Then, the second mounting substrate may comprise one or more second electrical connections to electrodes of the set of electrodes not connected to every second electrode of the set of electrodes between the electrodes connected to the one or more first electrical connections. The second electrical connections are beneficially arranged to provide an electrical power that is different from an electrical power provided by the first electrical connections, in particular an RF voltage of opposite phase to that provided to the first electrical connections (as will be discussed below). Alternative designs will be discussed below.

Figure 3A:
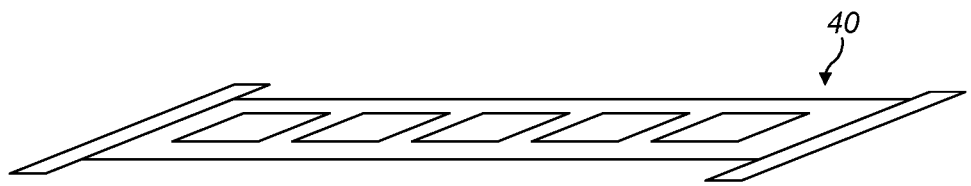
FIGS. 3A, 3B, 3C and 3D show manufacture steps for forming an ion guide in accordance with the design of FIG. 1.
Figure 3B:
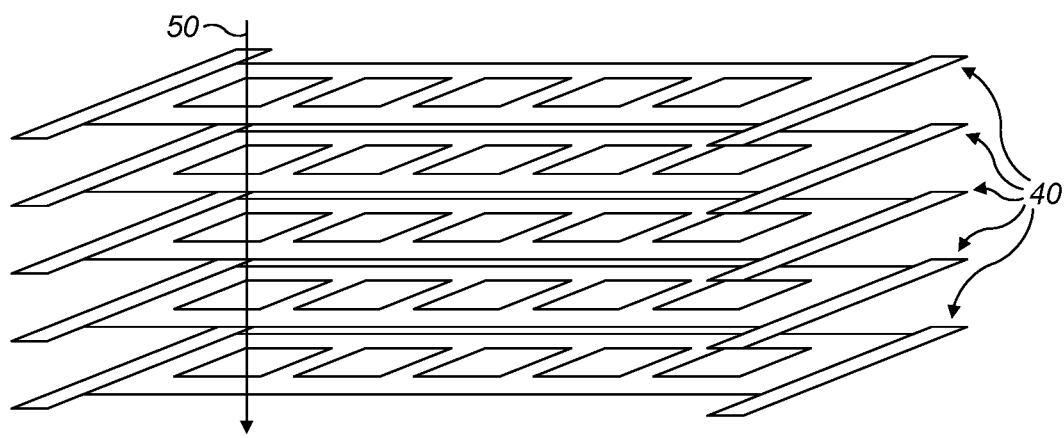
Figure 3C:
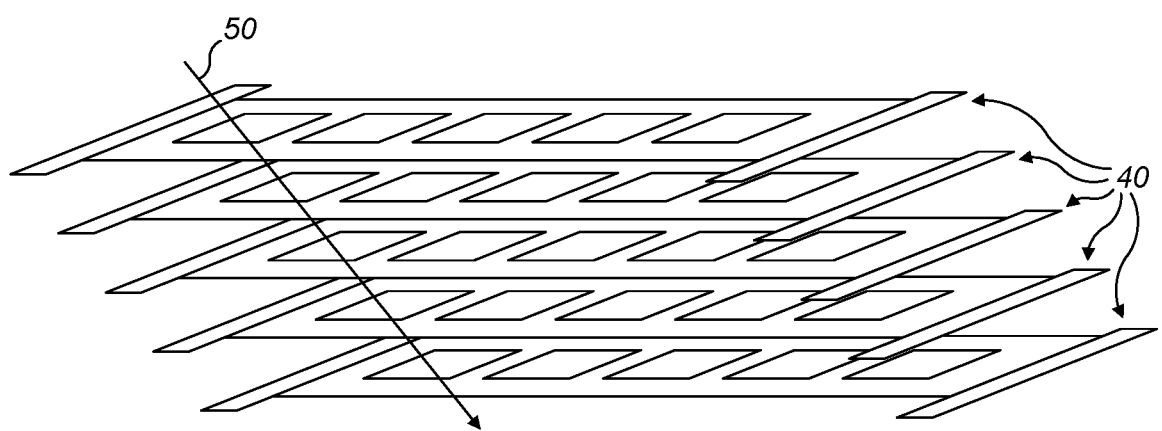
Figure 3D:
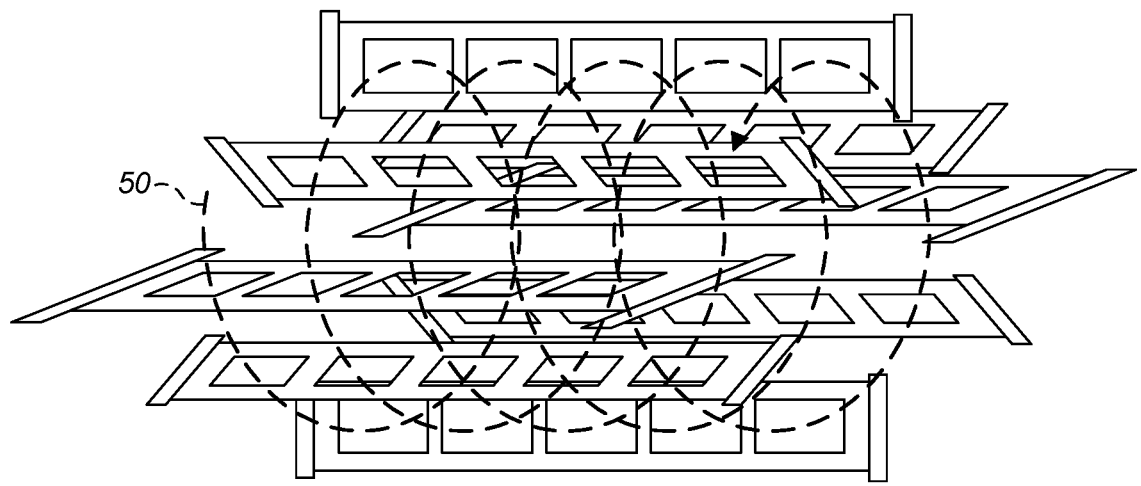

With reference to FIGS. 3A, 3B, 3C and 3D, there are shown manufacture steps for forming such an ion guide. In FIG. 3A, a single, elongated plate electrode 40 is shown, having 5 apertures (as an example). Multiple plate electrodes 40 are formed into a stack, as shown in FIG. 3B, and alignment of the apertures forms a plurality of individual channels for ions to flow therethrough, with an example ion path 50 being shown. Referring to FIG. 3C, the plate electrodes 40 are slightly shifted axially with respect to each other (by less than the aperture spacing) so that the apertures overlap and the ion paths 50 are slanted. In FIG. 3D, the plate electrodes 40 are placed along a cylindrical axis of rotation, whilst maintaining the axial spacing or function. The axial shift in one rotation is made equal to the aperture spacing and as a result, a single ion flight path 50 of a helical shape is formed, since the ion beam will switch at the end of each rotation to the next aperture on the plate electrodes. This ion flight path 50 can form a drift region for ions, for an IMS configuration in particular.

At a conceptual level, the approach described in the foregoing provides an ion guide (with corresponding drift region) formed from a stack of mounted electrode plates, each containing an array of apertures, where the last electrode meets the first. Through the application of an axial shift from one plate electrode 40 to the next, the paths through the apertures fuse into a single elongated ion path.

Figure 4:
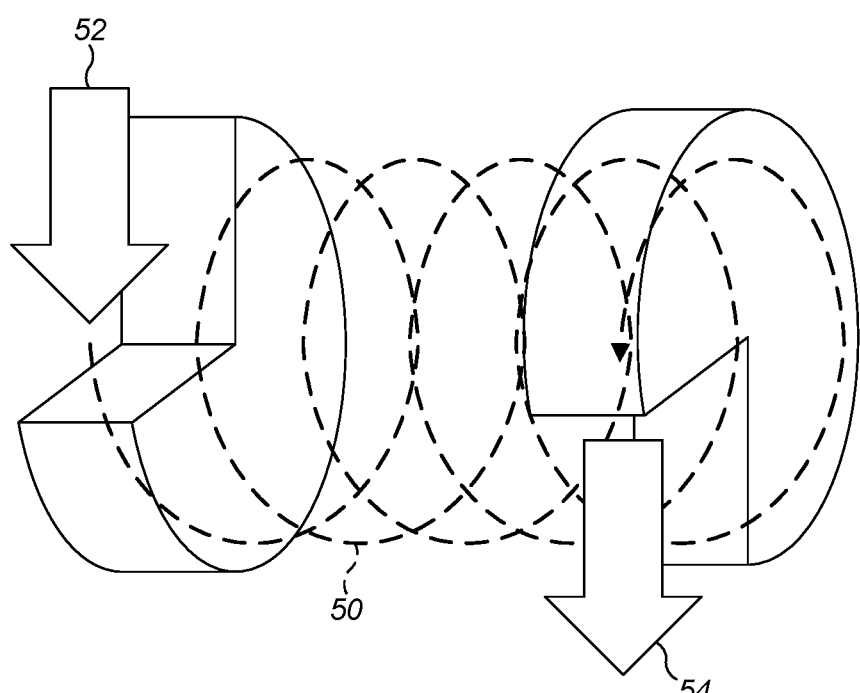
FIG. 4 schematically depicts an operation of an ion guide in accordance with the design of FIG. 1.

With reference to FIG. 4, there is schematically depicted an operation of an ion guide in accordance with the design of FIG. 1. Ions enter the ion guide through inlet 52 and proceed along the helical ion path 50, exiting the ion guide at outlet 54. The axial shift of the plate electrodes 40 (with reference to FIGS. 3C and 3D, for example) provides space for the injection and extraction of ions to and from the helical drift region. Ions can be injected to the ion guide by aligning the output of another ion optical device to the inlet 52 and received from the ion guide by aligning the input of a further ion optical device to outlet 54. If the spatial offset on the plate electrodes 40 is defined by the electrodes being mounted to a shaped component or spacer, the shape of that part is desirably configured to allow access to and from the channel.

Figure 5:
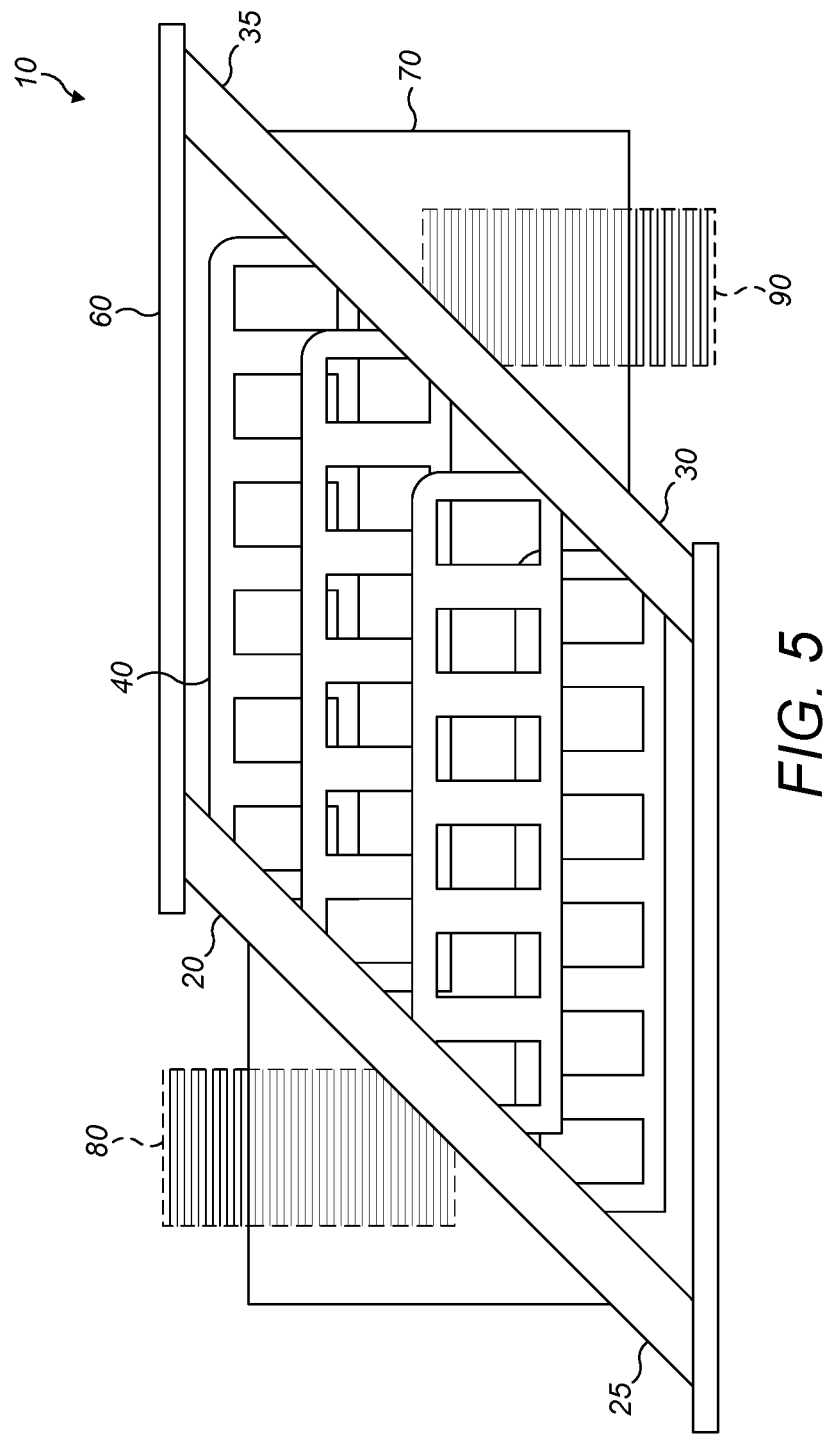
FIG. 5 is a schematic diagram showing connections to and interfaces with an ion guide in accordance with the design of FIG. 1, for operation.

Ions are constrained within the channel by applying different RF phases to each adjacent plate electrode 40 (in other words, the phase of the RF applied alternates between adjacent plate electrodes 40). If the plate electrodes 40 are mounted between two PCB substrates (as shown in FIGS. 1 and 2, for instance), it is advantageous to apply RF voltages having the opposing phases to the different PCB substrates to minimise capacitance effects. This is illustrated with reference to FIG. 5, which is a schematic diagram showing connections to and interfaces with such an ion guide 10. The plate electrodes 40 are mounted between first PCB substrate 20 and second PCB substrate 30. A metal cover 60 is provided to enclose the device, which is then mounted on a PEEK or metal mounting 70. Enclosing the ion flight path (drift region) allows maintaining it at a relatively elevated pressure compared with a surrounding vacuum of adjacent parts of the instrument. The pressure of region surrounding the metal cover 60 could be as low as $1\times10^{-4}$ Pa ($1\times10^{-6}$ mbar) and as high as 200 Pa (2 mbar), although $1\times10^{-3}$ Pa to 1 Pa ($1\times10^{-5}$ to $1\times10^{-2}$ mbar) is more typical. Within the ion guide (metal cover 60), a range of 0.01 to 1000 Pa ($1\times10^{-4}$ to 10 mbar) is possible, but likely optimised at or around 0.5 Pa ($5\times10^{-3}$ mbar). Ion mobility itself works over a wide range, but the required voltages can become dangerous if the pressure is too high.

An injection ion guide 80 is used to provide ions to the ion guide 10 and an extraction guide 90 receives ions from the ion guide 10. The injection ion guide 80 is preceded by an ion source (that is, the ion source is provided upstream from the injection ion guide 80). The ion source may be any suitable known type, for example: an atmospheric pressure ion source, electrospray ion source, chemical ionisation ion source, MALDI ion source, electron impact ion source, or laser ionization ion source. Generally, the ion source is followed by an ion trap or other ion bunching device (which may be incorporated into the injection ion guide 80 by applying appropriate stopping and extraction DC potentials). This can supply the drift region with tight packets (that is, pulses) of ions that can then be separated out by their mobility within the drift region. An ion detector is provided after the extraction guide, or a further mass analyser for more complex analysis.

A RF potential of a first phase 25 is supplied to the first PCB substrate 20, which then has electrical connections to alternate plate electrodes 40. A RF potential of a second, opposite phase 35 is supplied to the second PCB substrate 30, which then has electrical connections to the other plate electrodes 40, not connected to the first PCB substrate 20.

Ions may be propelled through the flight path 50 by application of a DC travelling wave to the first PCB substrate 20 and/or the second PCB substrate 30, which has electrical connections to the plate electrodes 40. Specifically, DC potentials are superimposed onto the two constraining RF voltages of opposite phases. This is potentially achieved in the same manner using a travelling wave, as discussed in US Patent Publication No. 2011/0168882 or less preferably using transient DC potentials, as discussed in US Patent Publication 2014/0353487. In the design of FIGS. 1 to 5, a single plate electrode 40 provides a potential for several points along the ion flight path 50. Consequently, it is difficult and not particularly practical to drive ions across with a constant DC gradient as would be conventional in existing IMS devices. As an alternative, an RF travelling wave may be created by applying several RF phases to adjacent plates in the manner of an ion conveyer (such as discussed in U.S. Pat. No. 6,894,286 or 9,536,721).

These features may be understood with reference to the generalised terms used above. In that sense, there may additionally be provided a power supply system configured to supply one or more voltages to the set of plate electrodes, so as to confine ions to or within the continuous ion flight path and/or to cause ions to travel through the continuous ion flight path.

There may be provided an RF power supply, configured to provide each electrode of the set of electrodes with a respective RF voltage, such that adjacent electrodes receive RF voltages with different phases. In particular, the RF voltages may cause ions to be confined within the continuous ion flight path. In some embodiments, the RF power supply may be further configured to provide each electrode of the set of electrodes with a respective RF voltage so as to cause ions to travel through the defined ion flight path. The RF power supply is preferably configured to provide a first RF voltage to every second plate electrode of the set of electrodes as spatially arranged and to provide a second RF voltage to every second plate electrode of the set of electrodes not receiving the first RF voltage. In particular, the first RF voltage generally has opposite phase to the second RF voltage. Advantageously, the first and second RF voltages have the same amplitude and/or frequency.

In preferred embodiments, there is also provided a DC power supply, configured to supply at least one DC potential to one or more electrodes of the set of electrodes. The DC power supply is preferably configured to provide DC voltages to at least some electrodes of the set of electrodes to form a travelling wave, so as to cause ions to travel through the defined ion flight path.

More specific details are now provided, in relation to the design shown in FIGS. 1 to 5. A stacked ring ion guide, of the type shown more specifically in FIG. 1, will typically have plate electrodes 40 spaced every 0.5 mm to 2 mm (the spacing could be uniform or variable), with plate electrode 40 having a thickness of between 0.25 mm and 1 mm (again, of uniform or differing thicknesses). Preferably, the plate electrodes 40 would be spaced every millimetre and be 0.5 mm thick. The plate electrodes 40 are typically metal, preferably made of steel or aluminium. Additionally or alternatively, the plate electrodes 40 may be partially or fully coated with a metal such as gold, which can be especially useful if the plate electrodes 40 are to be soldered to a PCB.

The apertures in the plate electrodes 40 may cover a wide variety of shapes, including circular, oval, rectangular, rings or less regular shapes. It is generally preferable that the apertures be of a letterbox (rectangular or rounded rectangular) or ovoid shape extending down the length of the ion guide. This may maximise the size of the aperture for space charge capacity, but minimise the diffusion caused by differences in the possible radii of the ion path. In this design, the aperture shapes are all the same. Alternative are discussed below, however.

The length and width of rectangular-shaped apertures may be anything from 1 mm upwards. Aperture width is preferably kept small, generally to less than (or no more than) 5 mm, to limit the ion path length variability. Larger widths are possible, especially if the radius of the helix is large (for instance, a radius of at least or greater than 150 mm). Aperture length may be limited by the available axial shift per adjacent aperture, which must itself be limited so as to maintain the integrity of the ion guide. Large axial shifts between apertures of adjacent plate electrodes 40 may cause transmission loss and ion diffusion. Generally, up to and around 100 µm of axial shift between apertures is considered safe, as this starts to approach the mechanical accuracy of the assembly, though perhaps considerably larger shifts are tolerable for rectangular apertures, for instance up to, around or slightly greater than 250 µm. The plate electrodes 40 are advantageously identical to one another and in this case, inter-aperture distance across the plate should be constant.

An example of an ion guide in accordance with the design of FIG. 1 would form a helical drift tube comprising 180 plate electrodes 40, each of which is 0.5 mm thick. The plate electrodes 40 are spaced every 1 mm (referenced to the centre of the apertures). This may give a compact central helical radius of 57.3 mm and 100 µm of axial shift between adjacent plate electrodes 40 allows a single turn of a helix to be up to 18 mm long. There may some overheads between apertures of adjacent plate electrodes 40, particularly for electrode material or to provide space for ion injection or extraction at the terminating ends. As a consequence, 15 mm long apertures are feasible.

If such a helix extends over 11 turns to form a device having an axial length of just below 20 cm (19.8 cm), the overall drift path (ion flight path) would be almost 2 m. Doubling or tripling this scale in all dimensions is mechanically feasible within a bench-top instrument, giving path lengths of 16 m and 54 m respectively. Longer path lengths than these start to become unnecessary and may suffer from a law of diminishing returns, as ions diffuse over the path length (since resolution is proportional to square root of path length). One issue is that very long thin electrode plates may start to sag, though this effect is averaged over many plates with each quarter turn and additional central support could be applied if necessary. Gas pressure within the device, preferably filled with helium or nitrogen, is normally around 0.1 mbar (10 Pa) to 1 mbar (100 Pa), although wide variations are possible.

An RF voltage of around 300V peak-to-peak as is suitable. The application of RF voltages of opposing phases to adjacent plate electrodes 40 means that the total number of plates is desirably an even number. If a travelling wave of transient DC pulses is applied, for example where an approximately 10V pulse is applied to every fourth electrode and that pulse is configured to "travel down" each series of four electrode plates, the total number of electrodes in a stack is desirably divisible by 4.

In generalised terms as discussed above, each plate electrode of the set of plate electrodes may have one or more of the same: shape; size; positioning of apertures; and spacing of apertures. For each plate electrode, the plurality of apertures are optionally all the same shape. The shape of the apertures may be same between plate electrodes, in some embodiments. Beneficially, each of the plurality of apertures of each plate electrode has a rectangular or ovoid (oval) shape. Circular, rectangular, rings and other regular (such as polygonal) or irregular shapes are also possible. Other shapes of aperture and differences between aperture shapes are discussed below.

Figure 6:
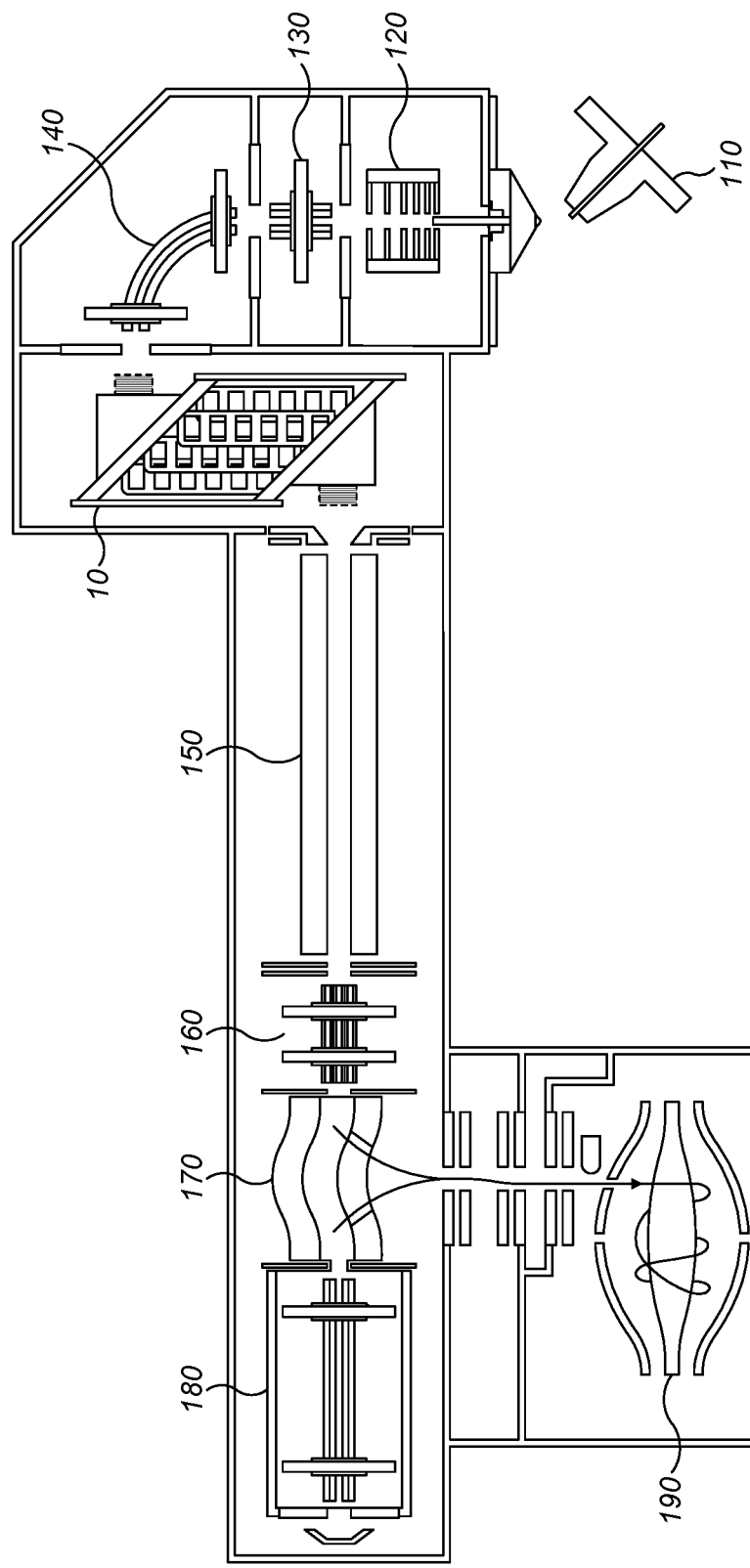
FIG. 6 schematically illustrates a mass spectrometer comprising an ion guide in accordance with the design of FIG. 1.

With reference to FIG. 6, there is schematically illustrated a mass spectrometer 100 comprising an ion guide in accordance with the disclosure. This comprises: an ion source 110; a S-lens 120; an input ion guide 130; a 90 degree ion guide 140; the ion guide 10 of FIGS. 1-5, as an ion mobility separator; a quadrupole mass filter 150; an output ion guide 160; a curved trap (C-trap) 170; a collision cell 180; and an orbital trapping mass analyser 190. In this example, the ion mobility separator 10 acts to separate out ions before the quadrupole mass filter 150. This can then be used, for example, to: enhance the duty cycle of the quadrupole mass filter 150; remove chemical interferences; and/or give mobility information for parent ions. In variations on this arrangement, the ion mobility separator 10 may additionally or alternatively be located after the quadrupole mass filter 150, or between the collision cell 180 and the C-Trap 170 for mobility separation of fragment ions.

In another configuration, the collision cell 180 could be located upstream of the C-trap 170 but downstream of the mass filter 150 and the ion mobility separator 10 could be located after the collision cell for mobility separation of fragment ions. It will be appreciated that still other configurations of mass spectrometer comprising an ion guide in accordance with the disclosure are possible. In general, any suitable existing configuration of mass spectrometer comprising an ion mobility separator may be constructed using the ion guide in accordance with this disclosure as the ion mobility separator.

It is noted that, even though such a system should be lossless in principle, elongated drift regions can have substantial ion losses. For sensitivity and possibly for some fast hybrid instrument modes of operation, an option to bypass completely the ion mobility separator 10 (with its elongated drift region) may be provided. Branched ion guides (such as discussed in US Patent Publication 2008/0061227) or traps (as considered in US Patent Publication 2014/0353487) connected via a short ion guide would be suitable for this purpose.

In generalised terms, an aspect of the disclosure may be considered as a mass spectrometer, comprising any ion guide as herein disclosed. Advantageously, the ion guide is configured to receive ions from an upstream ion source or ion optical device and to cause the received ions to travel along the ion flight path. The mass spectrometer may further comprise a mass analyser, configured to receive ions that have travelled along the ion flight path and optionally, analyse the received ions. In some embodiments, the mass spectrometer may further comprise an ion optical bypass arrangement, configured selectively to cause ions to travel from the upstream ion source or ion optical device to the mass analyser without passing through the ion guide. This may comprise one or more ion deflectors, for example.

It will be appreciated that variations to the foregoing design can be made while still falling within the scope of the disclosure. For example, the axial shift of the aperture between adjacent plate electrodes 40 does not need to be created by mounting plates between two helically-shaped PCBs. A single helical board could be used and the other terminus could be a block cut from PEEK or ceramic, with slots cut in to position the plates and a suitable hole cut to allow access to the terminus.

Figure 7A:
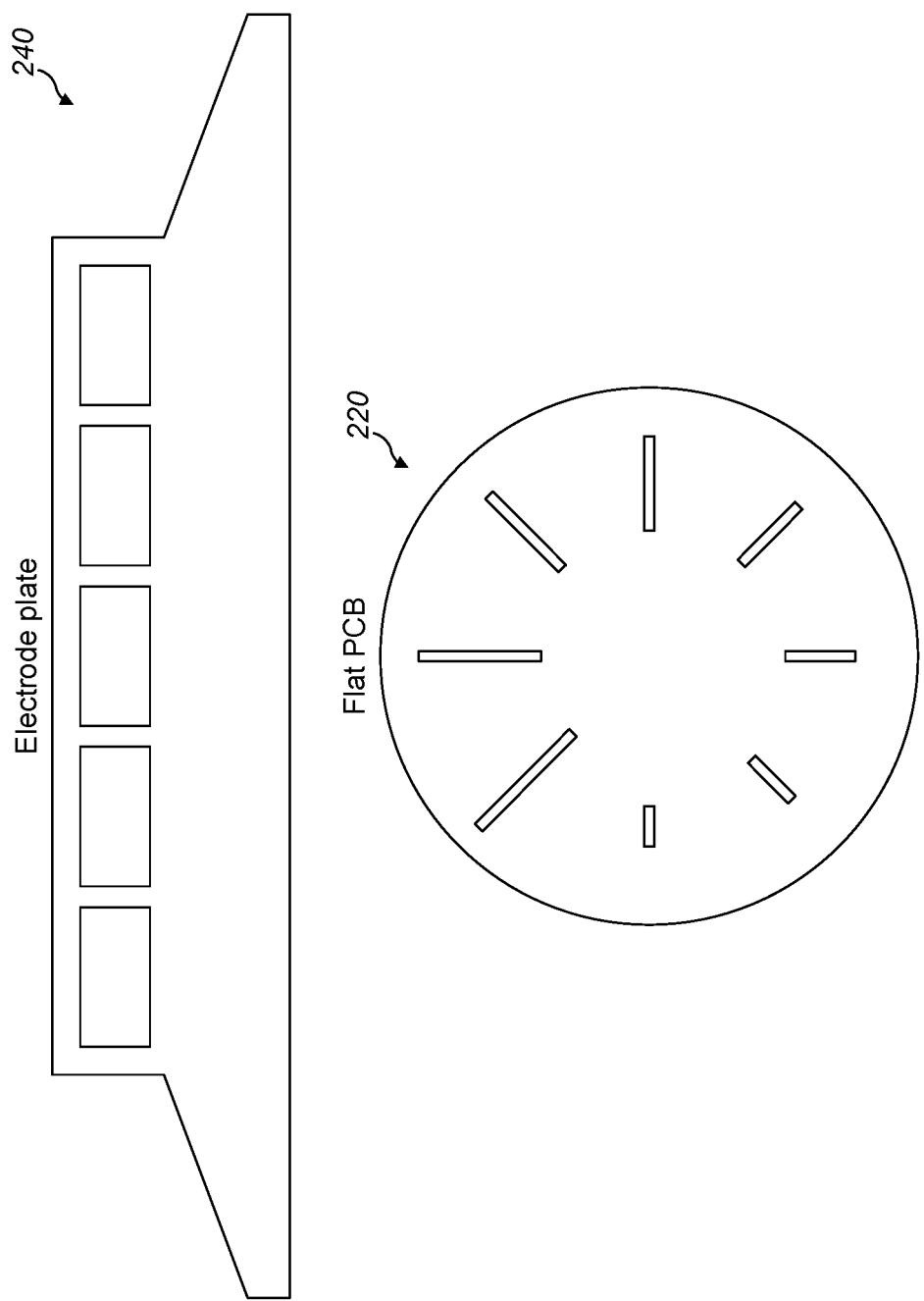
FIG. 7A depicts an example electrode structure and mounting substrate according to a second design of an ion guide in accordance with the disclosure.

With reference to FIG. 7A, there is depicted an example electrode structure and mounting substrate according to a second design of an ion guide in accordance with the disclosure. In this alternative design, the axial shift is entirely defined on flat PCBs 220 (or less preferably, additional metal or insulating parts), by providing the plate electrodes 240 with a wedged shape at one or both termini. The mounting PCBs 220 carry slots of varying length around the axis of rotation, such that penetration of the wedge into the slot varies in distance based on the slot width to control the axial position of the plates. Thereby, the plate electrodes 240 and thereby their respective apertures are provided with the progressive axial shift around the axis of rotation. Slots can be inexpensively laser-cut or milled into the PCB 220. The electrode plates are thereby mounted (in a sandwich fashion) between the two flat PCBs 220.

Figure 7B:
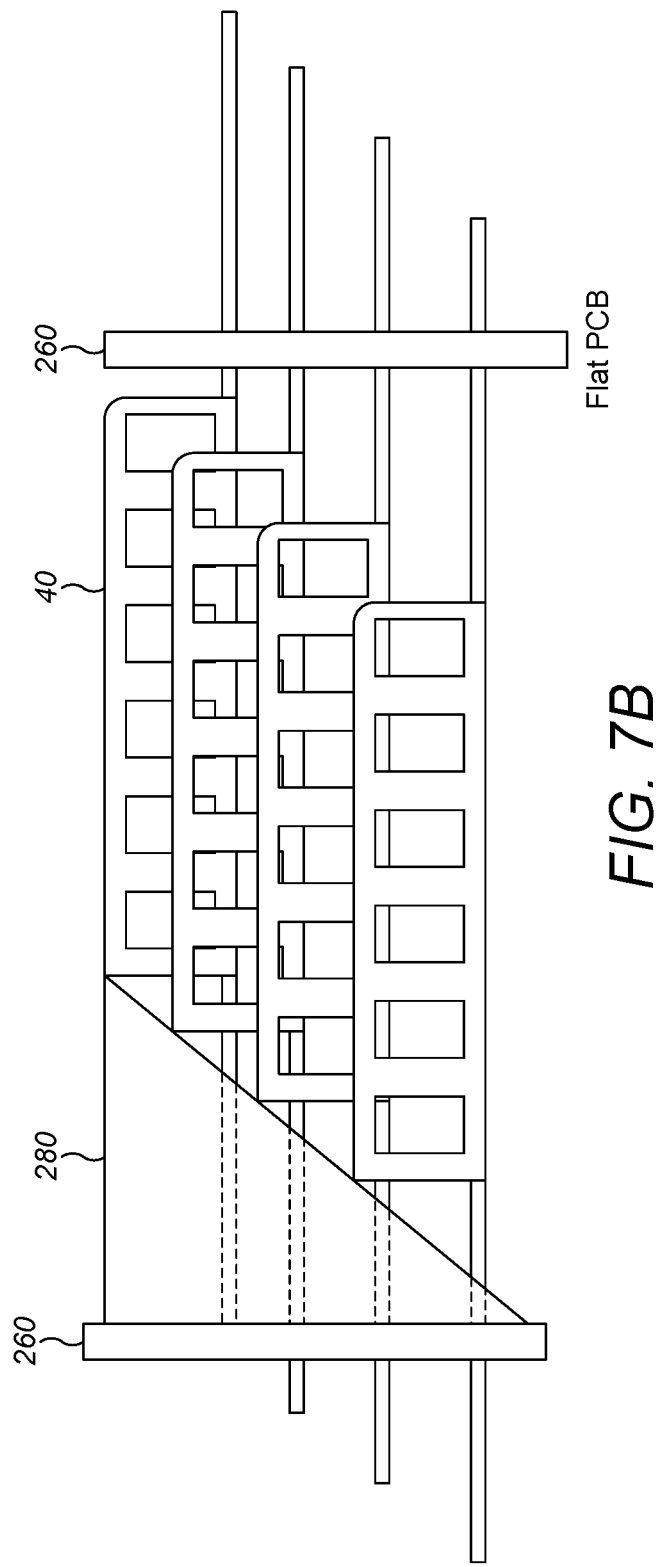
FIG. 7B depicts an example electrode structure and mounting substrate according to a third design of an ion guide in accordance with the disclosure.

Referring now to FIG. 7B, there is shown an electrode structure and mounting substrate according to a third design of an ion guide in accordance with the disclosure. This comprises: two opposing PCBs 260; an offset-defining spacer 280; and plate electrodes 40. In this alternative structure, the axial shift is defined by a function milled into the spacer piece 280 at a terminus of the plate electrode set 40. As an alternative, but similar approach slots of varying depth may be cut into the spacer. Such approaches allow positions of the plate electrodes 40 to be defined by a part other that the PCB 280. In either design, electrical connections may be made by soldering to one or more PCBs 260 mounted onto or near the spacer 280. Advantageously, the PCBs 280 can then be flat, with the connecting part of the plates penetrating through at various lengths.

PCBs are not strictly required, but useful as a means to deliver voltages. In one further design, electrical connections and to an extent mechanical definition and support may be made with metal rings with etched/cut connecting slots, or by direct wiring of the electrode plates.

In various designs, the plate electrodes, each with a series of electrode apertures, may be formed of PCB or ceramic plates with metallised apertures. A metallised PCB may benefit from reduced capacitance, but may suffer risk of charging and electrical breakdown from sharp metal edges. Metal plates may be constructed to minimise overlapping metal regions with opposing RF. Additional grounded plates may be placed between plate electrodes to which RF is applied, to shield opposing RF voltages from one another.

In the generalised sense discussed above, the mounting element may comprise a mounting substrate, to which each electrode of the set of electrodes is attached, the mounting substrate having a shape to thereby set the relative positioning of apertures between adjacent electrodes of the set of electrodes. Additionally or alternatively, the mounting element may comprise: a mounting substrate; and a spacer, positioned between the mounting substrate and the set of electrodes. The spacer may be configured to set the relative positioning of apertures between adjacent electrodes of the set of electrodes.

In a further alternative design, the plate electrodes may differ from one another, which still achieving the same effect as the design discussed above. One way to implement this would be to create the axial offset between apertures on adjacent plate electrodes by setting the aperture position on each plate electrode accordingly. This may greatly complicate manufacturing, but is still feasible. Care is desirably taken to maintain access for ion injection and extraction.

Figure 8B:
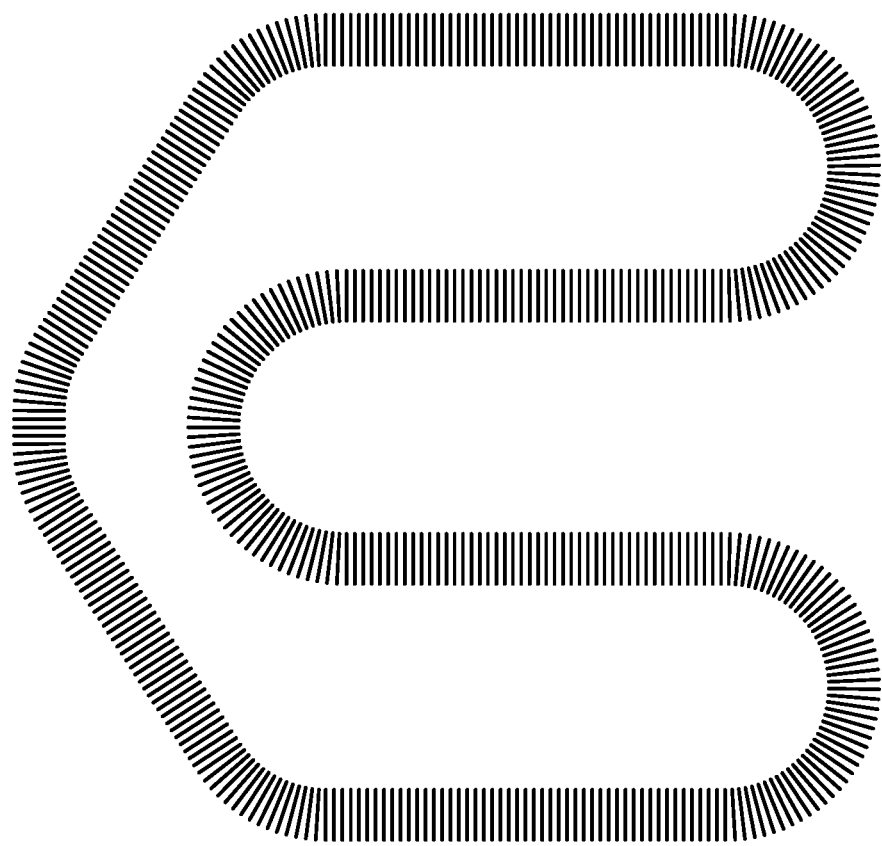
FIGS. 8A and 8B schematically show variant profiles for ion guides in accordance with the disclosure.
Figure 8A:
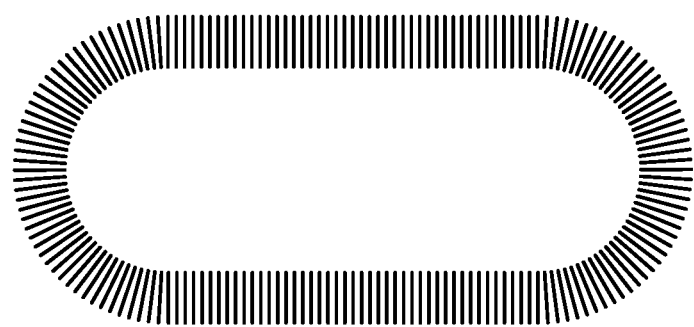

As mentioned earlier, resolution may be limited by variation in path length caused by ions being able to sit on the outer or inner radius of the helical path. Space charge effects will magnify this problem by forcing ions out to the extremes and keeping them there. Although the designs discussed above result in helical ion flight paths with a circular two-dimensional profile (for example, when viewed from directly above or directly below), other two-dimensional profiles are possible. Referring now to FIGS. 8A and 8B, there are schematically shown variant profiles for ion guides, in particular: (a) a rounded-rectangle (or "squared") profile; and (b) a labyrinthine profile. Other closed shapes for the two-dimensional profile could be envisaged. Two-dimensional profiles with a lower proportion of curvature than a circular profile, such as those shown in FIG. 8A, may help to mitigate this resolution limitation. Labyrinthine profiles may also more efficiently compress an ion flight path into the available space. Such structures still define an ion flight path with a generally helical shape, even though the ion flight path is not strictly a helix. That is, the ion flight paths in FIGS. 8A and 8B still comprise a rotational path, which also extends in a direction perpendicular to the direction of rotation, as with a helix.

Another option to address the issue of limited resolution is use of a figure-of-eight profile, an example of which is discussed in US Patent Publication 2014/0042315, mentioned above. The approach described there uses equal length regions of clockwise and anticlockwise curvature to equilibrate the path, for example allowing ions to spend equal time on outer and inner radii of the path, and thus compensate aberrations. Space charge effects may be helpful in this approach, as they prevent ions from migrating between different paths.

Figure 9:
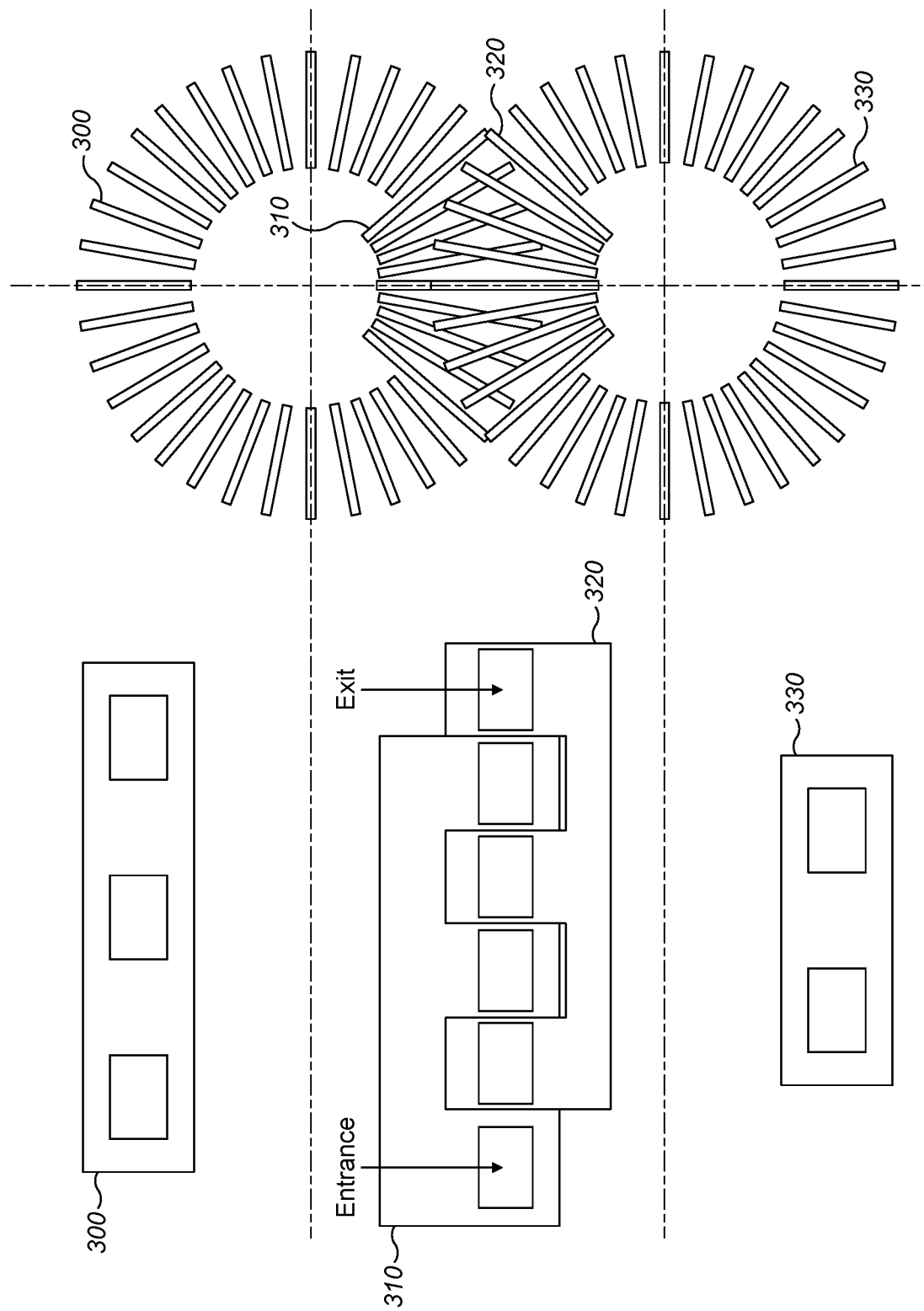
FIG. 9 depicts schematically an electrode structure and profile of a fourth design of an ion guide in accordance with the disclosure.

A difficulty with the embodiment of FIGS. 1 to 5 above is that it makes a figure-of-eight pattern difficult to implement, as ion paths of opposing curvature cannot normally cross. Referring now to FIG. 9, there is depicted schematically an electrode structure and profile of a fourth design of an ion guide, which addresses this issue. The right hand side shows the two-dimensional profile of the ion guide in accordance with this design and the left-hand side illustrates the structure of electrode plates at three different parts of the two-dimensional profile. Essentially, the figure-of-eight two-dimensional profile is formed using two helixes with circular profiles that overlap, to allow ions to move between helixes after each turn. The structure of electrode plates to allow this will be discussed below.

Starting with the top part of the two-dimensional profile, a first electrode plate structure 300 is shown. This electrode plate structure is no different from those shown in FIGS. 1, 3A to 3D and 5, for instance. In the middle of the two-dimensional profile, interleaving first 310 and second 320 electrode plate structures are shown. These elongated electrode plates have a serrated pattern, so that the first 310 and second 320 electrode plates interleave. As a result, ions following the curvature of the top helix are passed to the bottom helix to travel with an opposing curvature at the end of each turn, without ions come into conflict with one another. It will be recognised that the passing of ions between the opposing curvature flight paths need not happen after every turn, but preferably is caused to happen such that the ions travel the same distance through flight paths of both opposed curvatures. Such a design can be beneficial, but is mechanically complex.

In the general sense discussed above, it may be considered that the helical or helical-based shape defines a two-dimensional profile. Then, the relative positioning of each plurality of apertures of a respective plate electrode of the set of plate electrodes and respective adjacent plate electrodes of the set of plate electrodes preferably defines the continuous ion flight path to extend multiple times along the two-dimensional profile. In other words, the continuous ion flight path extends multiple turns around the helical-based shape.

The two-dimensional profile has, in one embodiment, a circular shape. Other closed-loop shapes are possible, such as oval, rounded rectangular or labyrinthine. In certain embodiments, the two-dimensional profile has a figure-of-eight (lemniscate) shape. One way to implement such a design is for the set of plate electrodes to comprise first and second pluralities of (plate) electrodes. Each of the first and second pluralities of electrodes is arranged to define a respective circular two-dimensional profile. Some of the first plurality of electrodes and some of the second plurality of electrodes are arranged to interleave with one another, such that the two-dimensional profile of the first plurality of electrodes overlaps with the two-dimensional profile of the second plurality of electrodes. Then, the continuous ion flight path is advantageously defined by the plurality of apertures of both the first and second pluralities of electrodes. For example, the interleaving electrodes may have a serrated shape (typically with a square form). The serration of the interleaving electrodes from the first plurality of electrodes is beneficially configured to mirror the serration of the interleaving electrodes from the second plurality of electrodes, such that the electrodes can interleave. The apertures of the first plurality of electrodes may thereby receive ions from the apertures of the second plurality of electrodes and the apertures of the second plurality of electrodes may receive ions from the apertures of the first plurality of electrodes accordingly.

Figure 10A:
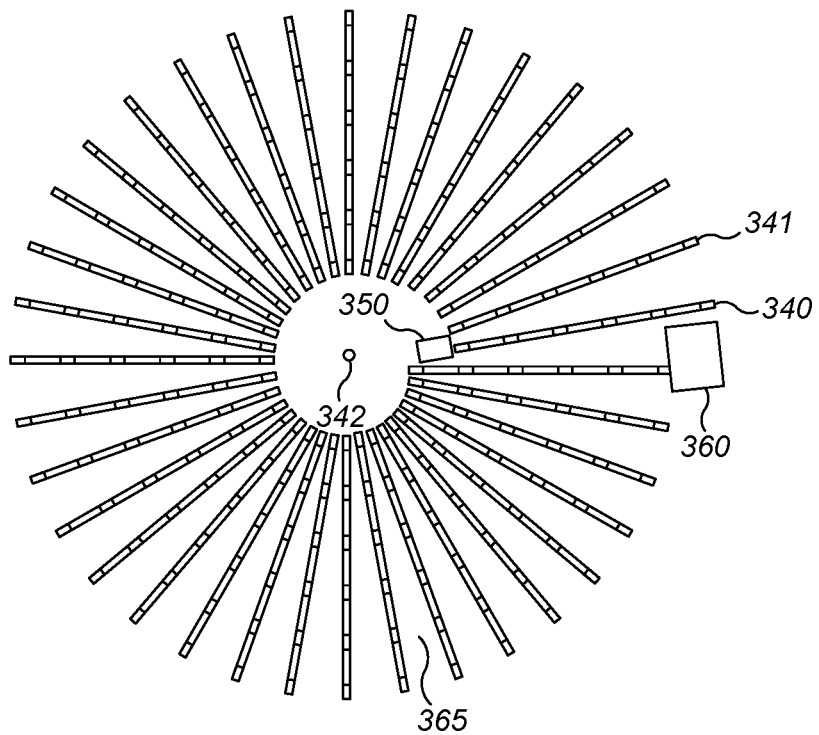
FIG. 10A shows a top view of a fifth design of an ion guide in accordance with the disclosure.

Further alternative structures can be considered. With reference to FIG. 10A, there is shown a top view of a fifth design of an ion guide in accordance with the disclosure. This depicts another type structure that can be efficiently built with multi-aperture electrodes as a "flat spiral". In this design, adjacent plates need not be shifted relative to one another along the axis of rotation, along which the plate electrodes are arranged. Instead, the distance of the plate electrodes from the rotational axis is shifted between successive plate electrodes. If the plates are arranged facing away from the axis of rotation this forms a single spiral path for the ions, instead of a helical path.

In FIG. 10A, the multi-aperture electrodes 340 (shown here, each having 5 apertures 341) are each shifted perpendicularly to the axis of rotation (marked by dot 342 and extending into and out of the plane of the drawing). As shown in this drawing, ions would enter the structure at inlet port 350 and exit the structure at outlet port 360. They would therefore travel along spiral-shaped ion flight path 365. This approach may be combined with others disclosed herein, for instance the other described methods for equalisation of flight path for ions on the inner and outer radii may also be applied, as discussed below.

The axial offset can be implemented in the same manner as for the helical structures, that is via bending of the support PCB (which would be located at the outer edge of plate electrodes 340 and extend into the plane of the drawing), slots that define penetration of the electrodes into the support or a spacer piece, or other suitable structure.

In the general terms as considered above, some or all of the set of plate electrodes may be spatially arranged around an axis that is perpendicular to the first dimension (the dimension along which the plurality of apertures of each plate electrode are spaced). Then, the first dimension is typically radial to the axis and the continuous ion flight path has a spiral-based shape. A spiral-based shape may refer to a shape having a fundamental spiral character, for instance a curve with a generally increasing (or decreasing) radius from the axis. In particular, this may be achieved by each respective adjacent plate electrodes of the set of plate electrodes being positioned so as to be offset from one another in the first dimension (the radial dimension). Variants on a spiral shape (in which the spiral character is modulated by some other shape, for example with a slight variation in a dimension perpendicular to the direction of the spiral travel, to 'zigzag') can also be considered.

Some helical character may be included by adding an axial shift in addition to the radial, to allow: space for adjacent ion optical components; or space to switch the ion path from spiral to anti-spiral configurations (by reversing the radial shift trend). Thus, this may greatly extend the path length within a small space, by stacking alternating spiral and anti-spiral structures. A structure in accordance with this latter proposal is discussed with reference to FIGS. 10B, 10C and 10D.

Figure 10B:
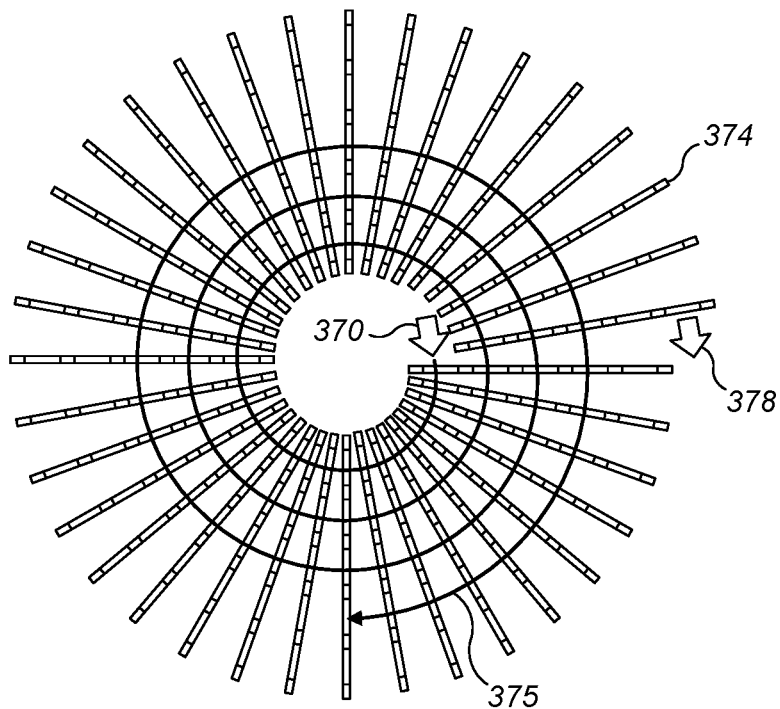
FIG. 10B shows a top view of a first part of a variant on the design of FIG. 10A.
Figure 10C:
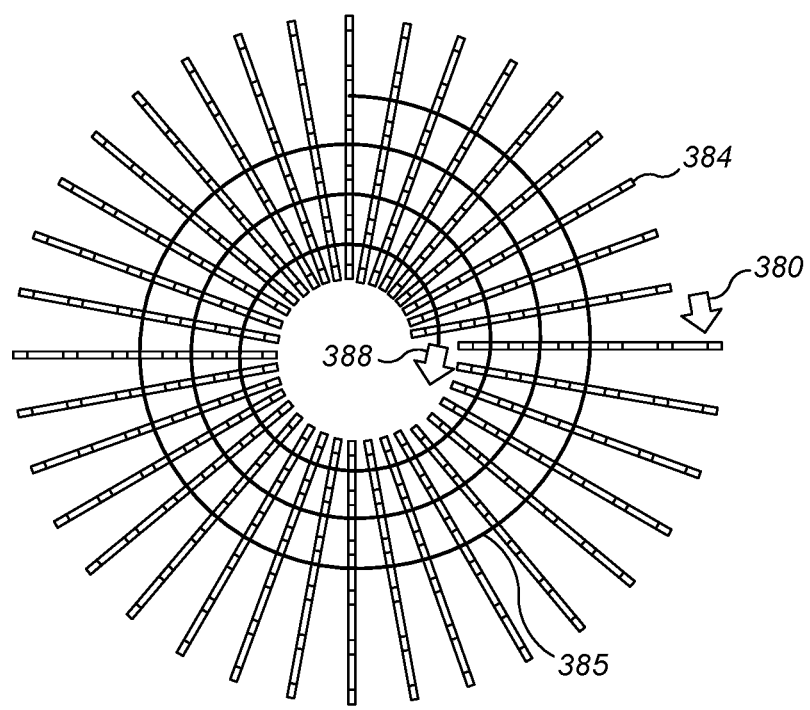
FIG. 10C shows a top view of a second part of the design of FIG. 10B.
Figure 10D:
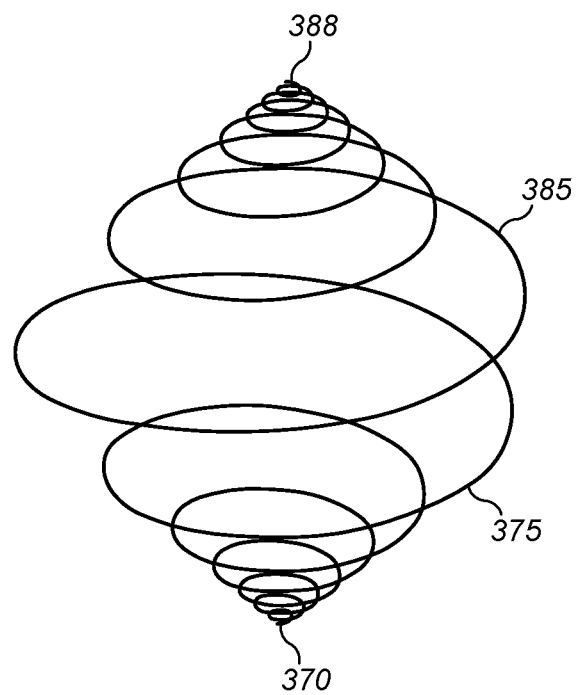
FIG. 10D schematically illustrates an ion flight path for the design of FIGS. 10B and 100.

With reference to FIG. 10B, there is shown a top view of a first part of a variant on the design of FIG. 10A and with reference to FIG. 10C there is shown a top view of a second part of this variant design. The two parts are stacked (in two levels) with the part shown in FIG. 10B on bottom (level 1) and the part shown in FIG. 10C on top (level 2). Ions enter the structure through ion inlet 370 and pass through first plate electrodes 374 to travel along first spiral ion flight path 375 (an outward travelling spiral) and emerge through intermediate ion outlet 378. These ions are then directed (potentially through further deflection electrodes, not shown) to intermediate ion inlet 380 on the second level (FIG. 10C). From here, the ions pass through second plate electrodes 384 to travel along second spiral ion flight path 385 (an inward travelling spiral) and emerge through ion outlet 388. Electrode plates may be constructed (for example etched) with two dimensions of aperture stacking, such that multiple levels may be incorporated into a single ring of electrode plates. Referring to FIG. 10D, there is schematically illustrated the ion flight path for the design of FIGS. 10B and 10C, using the same reference numerals as those drawings to indicate the path of ions from ion inlet 370, through spiral ion flight region 375 and opposing spiral ion flight region 385 to emerge at ion outlet 388.

In general terms, each respective adjacent plate electrodes of the set of plate electrodes may be positioned so as to be offset from one another in the axial dimension. This can cause the continuous ion flight path to have a shape that is both spiral-based and helical-based.

In embodiments, it may be considered that the set of plate electrodes comprises first and second pluralities of electrodes. The first plurality of electrodes are typically spatially arranged such that a relative positioning of each plurality of apertures of a respective plate electrode of the first plurality of electrodes and respective adjacent plate electrodes of the first plurality of electrodes defines a first continuous ion flight path through the respective plurality of apertures of each plate electrode of the first plurality of electrodes. The second plurality of electrodes are generally spatially arranged such that a relative positioning of each plurality of apertures of a respective plate electrode of the second plurality of electrodes and respective adjacent plate electrodes of the second plurality of electrodes defines a second continuous ion flight path through the respective plurality of apertures of each plate electrode of the second plurality of electrodes. The second plurality of electrodes may be stacked on the first plurality of electrodes (for instance, with the first plurality of electrodes being generally arranged in a first plane and the second plurality of electrodes being arranged in a second plane that is parallel to the first plane but spaced from the first plane in a direction perpendicular to it), such that ions exiting the first continuous ion flight path are directed onto the second continuous ion flight path. This is particularly advantageous where the first and/or second continuous ion flight paths have a spiral-based and helical based shape.

For example, an entrance to the first continuous ion flight path may be provided at a first end of one of the first plurality of electrodes and an exit from the first continuous ion flight path may be provided at a second end of one of the first plurality of electrodes, opposite the first end (the first and second ends being defined in the first dimension). Then, an entrance to the second continuous ion flight path may be provided at the second end of one of the second plurality of electrodes (aligned with the second end of the first plurality of electrodes) and an exit from the first continuous ion flight path may be provided at the first end of one of the second plurality of electrodes (aligned with the first end of the first plurality of electrodes).

Optionally, the first plurality of electrodes is spatially arranged around a first axis (the first continuous ion flight path extending along a direction of the first axis) and the second plurality of electrodes is spatially arranged around a second axis (the second continuous ion flight path extending along a direction of the second axis). Then, the first and second axes may be (substantially) parallel or (substantially) co-axial.

As mentioned previously, although it can be advantageous that each of the plate electrodes be identical, it is not necessary. A further benefit in mitigating the resolution reduction can result from changing the aperture shape between apertures of adjacent electrodes along the ion flight path. This is explained with reference to FIG. 11A, in which there are illustrated first examples of electrode aperture shapes 400, 410, 420, 430, 440, 450, 460, 470. By changing the shape of apertures in sequence along the ion flight path (showing by the increasing reference numerals), ions may be induced to follow a tight path around the outer and inner radius, at least once per turn of the main helix. This may be equivalent to stirring the trapped ion packets, so that they follow a more equal path length. This approach could potentially be applied to any ion mobility device with curvature and need not only be used with ion guides as described previously (for example, having a helically-shaped ion flight path). The force creating this effect may be applied by variation in the shape of apertures as ions progress around each curve or turn of the ion flight path. At a conceptual level, it may be understood that the variation in the structure of the apertures is such that entrained ions experience similar drift paths to one another, even if there is considerable variation in the inner and outer radius of the aperture stack.

Figure 11A:
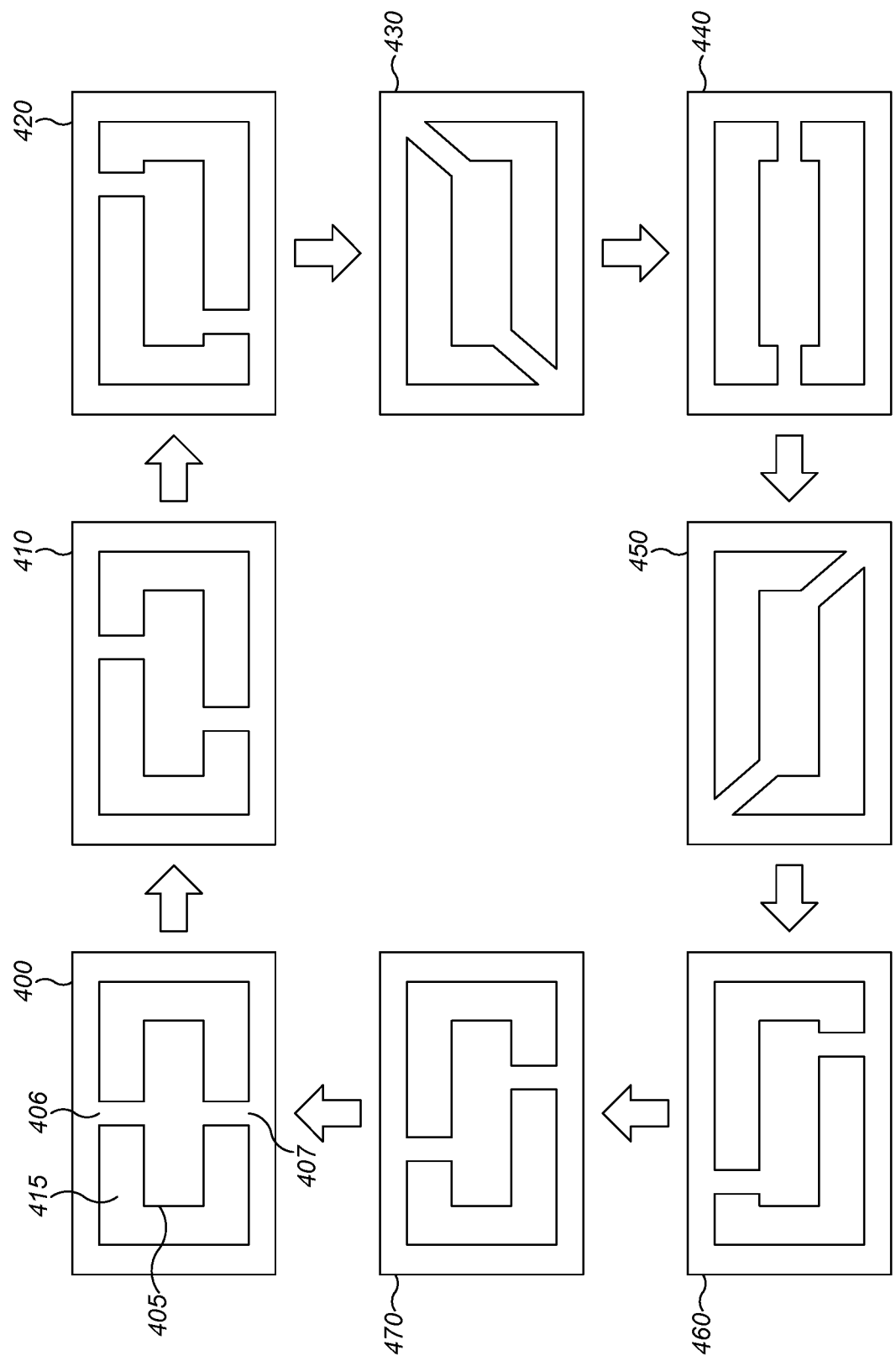
FIG. 11A illustrates a first example of electrode aperture shapes in accordance with the disclosure, suitable for ion guides.

The approach shown in FIG. 11A has two connected slots 405, 415 as apertures (though more such slots could be used, if desirable). Thus, for example, each of the apertures in the embodiments of plate electrodes shown in FIGS. 1, 3A-D and 5, could be made to comprise the two slots. Nodules or vanes 406, 407 separating the slots appear to move around and/or change shape as with increasing distance along the ion flight path, that is as progressively moving through apertures from plate to plate, causing ions to migrate around the aperture. It is not necessary for the nodules or vanes 406, 407 to separate the apertures completely, although this is shown for simplicity. Although the slots 405, 415 and nodules or vanes 406, 407 are only shown for a first electrode 400, the corresponding parts in the other electrodes will immediately be recognised. Thus, ions travelling along the ion flight path are caused to shift in a direction perpendicular to the direction of the ion flight path. By shifting the ions in a perpendicular direction, particularly at the one or more curved portions of the ion flight path, the ions may be caused to travel along different parts of the ion flight path cross-section, for example to rotate around the apertures and thereby define a helical shape with the direction of the ion flight path being the axis of the helical shape.

FIG. 11A demonstrates this approach with an aperture formed of two linked slots in a generally rectangular shape. Referring next to FIG. 11B, there is shown further examples of electrode aperture shapes in accordance with the disclosure, suitable for ion guides. As shown in this drawing, the aperture could also be a ring shape 480 (shown in this drawing with a single vane 481, although more than one such vane or nodule could be used) that shifts rotationally between successive electrodes as shown by the arrow, just a wide slot 482 with force applied by rotation of the slot between electrodes arranged in a sequence as shown by the arrows or a ring slot 484 with one or more penetrating nodules 485 protruding from the aperture side that shift in accordance with the (this is less preferable as ions could migrate around the slot by themselves resulting in diffusion).

Although this effect has been shown by changing the shape of apertures along the ion flight path length, it may alternatively be achieved by applying a voltage on additional electrodes mounted between the RF apertures, for example.

In a second aspect of a generalised sense (which may be combined with other aspects as herein described), there may be considered an ion guide comprising a plurality of electrodes. Each electrode comprises at least one aperture, so as to define an ion flight path (through the apertures) having at least one curve, which may define an average radius of curvature. An aperture of a first electrode of the plurality of electrodes is adjacent to an aperture of a second electrode of the plurality of electrodes along the ion flight path. Then, the aperture of the second electrode has a shape, electrical potential, and/or position different from that of the aperture of the first electrode so as to cause ions travelling along the ion flight path to shift in a direction perpendicular to the direction of the ion flight path. By shifting the ions in a perpendicular direction, particularly at the one or more curved portions of the ion flight path, the ions may be caused to travel along different parts of the ion flight path cross-section. In particular, the ions may not necessarily be forced towards an inside or outside part of the curved portion. In a preferred embodiment, the ions may be caused to oscillate between inside the average radius of curvature and outside the average radius of curvature. Such approaches may mitigate resolution limitations due to path length variations. For instance, a difference in flight path length between ions entering the ion guide at a position inside the average radius of curvature and ions entering the ion guide at a position outside the average radius of curvature may be corrected To combine this with the first aspect, it may be considered (for example) that the ion flight path has a spiral-based and/or helical-based shape. Moreover, each electrode may have a plurality of apertures. The electrodes may be a plate electrode or an electrode structure that functionally mimics a plate electrode.

In this second aspect, the direction perpendicular to the direction of the continuous ion flight path is preferably defined by a helical (or helical-based) shape, with the direction of the ion flight path being an axis of the helical shape. By causing ions to "spiral" (that is in this context, travel in a helical shape), the ions are effectively stirred. It should be noted that (especially in combination with the first aspect), the ion flight path may itself have a spiral and/or helical shape, such that the ions travel along a spiral-based and/or helical-based shaped ion flight path, in a helical motion (which may be termed a further helical shape) perpendicular to that path.

In some embodiments, the aperture of the first electrode and the aperture of the second electrode each comprise a respective first slot and a respective second slot. Each first slot is advantageously distinct and/or separated from the respective second slot. Then, the first slot of the aperture of the second electrode advantageously has a shape and/or position different from the first slot of the aperture of the first electrode so as to cause ions travelling along the ion flight path to shift in a first direction perpendicular to the direction of the ion flight path. Additionally or alternatively, the second slot of the aperture of the second electrode has a shape and/or position different from the second slot of the aperture of the first electrode so as to cause ions travelling along the ion flight path to shift in a second direction perpendicular to the direction of the ion flight path.

In one embodiment, each first slot and each second slot have a shape defined by respective portions of the same rectangle (with each of the first and second slots optionally including at least one corner of the rectangle). In embodiments, the aperture of the first electrode and/or the aperture of the second electrode each comprise a ring shape (which may be circular, oval, rectangular or another annular form).

In some designs, the aperture of the first electrode and/or the aperture of the second electrode each further comprise one or more vanes or nodules protruding from a side of the respective aperture that shift rotationally between the first and second electrodes. In other designs, the aperture of the first electrode and the aperture of the second electrode each comprise a wide or straight slot. Then, the slot may shift rotationally between the first and second electrodes. The rotational shift of the vanes, nodules and/or slot may cause the ions to shift perpendicularly to the flight path direction.

Preferably, the first and second directions are the same. In other words, the relative positioning the first and second slots both cause ions to be pushed in the same way. This is typically in a helical motion, as discussed above, such that the first direction is defined by a first further helical shape and the second direction is defined by a second further helical shape. Then, the direction of the ion flight path is preferably an axis of both the first and second further helical shapes. The first and second further helical shapes may be the same. Optionally, the second direction may be different from the first direction, for example, if one of the first and second further helical shapes being right-handed and the other being left handed (different chirality).

As discussed above, electrode arrangements or structures may be employed that are not strictly plate electrodes, but which have the same functional effect. One such structure is described with reference to FIG. 12, in which a perspective view of a sixth design of an ion guide is shown. This uses stacked bar electrodes 510, 520, rather than plate electrode apertures. The stacked bar electrodes 510, 520 can be seen as a stack of electrode arrangements, in which each arrangement comprises two parallel bar electrodes, with a respective gap therebetween (the gap being in a dimension orthogonal to a direction of elongation of the bar electrodes). A RF voltage with a first phase is applied to first bar electrodes 510 and a RF voltage with a second, opposite phase is applied to second bar electrodes 520. Preferably, no DC voltages are applied to the first bar electrodes 510 and second bar electrodes 520. In between the RF bar electrodes 510 and the RF bar electrodes 520, further electrodes 500 are provided with a DC voltage applied. No RF voltages are advantageously applied to the further electrodes 500. The DC electrodes 500 therefore interleave between successive RF bar electrodes 510, 520. These DC electrodes 500 provide lateral focusing. In this design, they are shown as plate electrodes, but they may equivalently be provided using bar electrodes or wires held from above or below. The DC electrodes 500 thus can be seen to provide parallel electrode parts (vertical parts in the figure), with a respective gap therebetween (the plane of the gap being generally parallel to and spatially separated from the plane of the gap between the bar electrodes 510 and/or the plane of the gap between the bar electrodes 520), which are arranged orthogonally (at right angles) with respect to the parallel RF bar electrodes 510, 520. The electrode parts of the DC electrodes 500 may be parts of the plate at the sides of the plate aperture, or may be parallel DC bars or wires. In this way, the ion flight path or channel is defined in one dimension by the stacked arrangements of parallel bar electrodes carrying alternating RF potentials, and in another (orthogonal) dimension by DC electrode parts (which may be bar electrodes or aperture sides within an elongated plate). The bar electrodes 510, 520 therefore traverse the circumference of the ion flight path cross-section (the effective 'aperture' created by the parallel RF bar electrodes 510, 520 together with the DC electrodes 500).

A downside with this configuration as that the DC electrodes 500 come between the RF bar electrodes 510, 520, increasing the RF stack separation. It has some advantages though, in that the DC parts 500 can shield the opposing RF potentials from one another, reducing capacitance. The channel height in this arrangement can be widely varied using the DC parts 500 alone and is not constrained by physical restrictions imposed by the RF electrodes 510, 520. This can be useful where narrow channels are desirable (as high channels can create resolution losses). Moreover, the travelling wave DC voltage could be applied using the DC parts 500 alone and not have to be mixed in with RF voltages. Alternatively, the RF electrodes 510, 520 and DC components 500 may be swapped.

Figure 12:
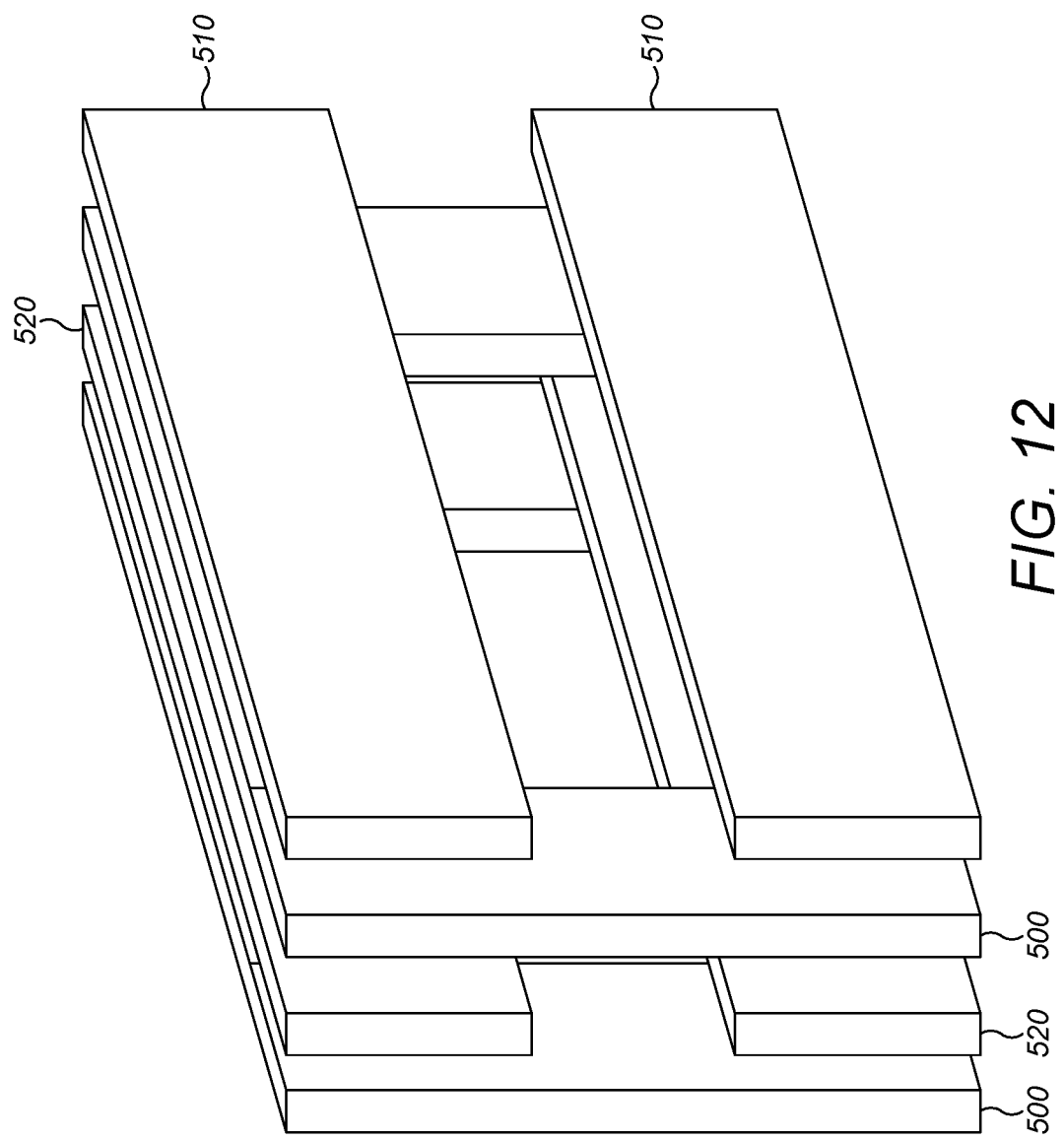
FIG. 12 is a perspective view of a sixth design of an ion guide in accordance with the disclosure.

A particular benefit of a structure as shown in FIG. 12 may be realised when such a structure is employed in the construction of a spiral ion guide, for instance of the type discussed with reference to FIGS. 1 to 5. In such an implementation, two relatively long parallel RF (optionally only; that is supplied only with one or more RF potentials) bar electrodes may be used to create an elongated channel in a first plane. Then, a layer of orthogonal DC wires, bars or apertures are provided (mounted) in a second plane, separated from the first plane (and preferably generally parallel to the first plane, at least in one dimension). The layer of DC (only; that is supplied only with one or more DC potentials) electrodes divides the channel and defines the ion path and/or number of turns in the spiral. Alternatively, (and in line with the swapped arrangement discussed above), the relatively long parallel bar electrodes may be provided with DC (only; that is only one or more DC potentials) and the layer of orthogonal wires, bars or apertures may be provided with RF (only; that is only one or more RF potentials).

In a generalised sense, there may be considered an ion guide in accordance with a third aspect. This ion guide comprises: a first plurality of electrode arrangements, each electrode arrangement comprising respective parallel bar electrodes, with a respective gap therebetween; and a second plurality of electrode arrangements, each electrode arrangement comprising respective parallel electrode parts, with a respective gap therebetween. The parallel electrode parts of the second plurality of electrode arrangements are preferably arranged orthogonally (at right angles) with respect to the parallel bar electrodes of the first plurality of electrode arrangements. The respective gaps of the first plurality of electrode arrangements are aligned with the respective gaps of the second plurality of electrode arrangements to (effectively provide apertures that) allow ions to travel therethrough along a continuous path. The first and second pluralities of electrode arrangements are advantageously arranged alternately along the continuous path. The parallel bar electrodes of the first plurality of electrode arrangements and the parallel electrode parts of the second plurality of electrode arrangements may effectively mimic plate electrodes in a functional sense.

Preferably, each of the first plurality of electrode arrangements is provided with an RF potential and in some embodiments only an RF potential (that is, any potential or potentials supplied to each electrode have no DC component). Additionally or alternatively, each of the second plurality of electrode arrangements is provided with a DC potential and more preferably only a DC potential (that is, any potential or potentials supplied to each electrode have no RF component). This may be reversed, such that each of the first plurality of electrode arrangements is provided with a DC potential and more preferably only a DC potential (that is, any potential or potentials supplied to each electrode have no RF component). Additionally or alternatively in this case, each of the second plurality of electrode arrangements is provided with an RF potential and in some embodiments only an RF potential (that is, any potential or potentials supplied to each electrode have no DC component). Optionally, successive electrode arrangements in the first plurality of electrode arrangements (or for the reversed arrangement, in the second plurality of electrode arrangements) are provided with RF potentials of different (optionally, opposite) phase. The use of DC only electrodes may partially shield the RF electrodes (in particular, when successive electrodes are supplied with RF potentials of different phases), as discussed above. In some embodiments, each electrode arrangement of the second plurality of electrode arrangements comprises a respective (optionally, plate; in this sense, a plate is meant and not a structure that mimics a plate) electrode having an aperture to provide the respective gap.

Although the invention has been described with reference to particular types of devices and applications (particularly mass spectrometers and/or ion mobility spectrometers) and the invention has particular advantages in such case, as discussed herein, the invention may be applied to other types of device and/or application. The specific manufacturing details of the ion guide and associated uses, whilst potentially advantageous (especially in view of known manufacturing constraints and capabilities), may be varied significantly to arrive at devices with similar or identical operation. Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an analogue to digital convertor) means "one or more" (for instance, one or more analogue to digital convertor). Throughout the description and claims of this disclosure, the words "comprise", "including", "having" and "contain" and variations of the words, for example "comprising" and "comprises" or similar, mean "including but not limited to", and are not intended to (and do not) exclude other components.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the aspects and/or features disclosed in this specification may be combined in any combination, except combinations where at least some of such features and/or steps are mutually exclusive. As described herein, there may be particular combinations of aspects that are of further benefit, such the aspects of ion guides for use in mass spectrometers and/or ion mobility spectrometers. In particular, the preferred features of the invention are applicable to all aspects of the invention and may be used in any combination. Likewise, features described in non-essential combinations may be used separately (not in combination).

The invention claimed is:

1. An ion guide comprising a plurality of electrodes, each electrode comprising at least one aperture, so as to define an ion flight path having at least one curve, wherein:
   an aperture of a first electrode of the plurality of electrodes is adjacent to an aperture of a second electrode of the plurality of electrodes along the ion flight path; and
   the aperture of the second electrode has a shape, electrical potential, and/or position different from that of the aperture of the first electrode so as to cause ions travelling along the ion flight path to shift in a direction perpendicular to a direction of the ion flight path, such that the ions travel along different parts of the at least one curve of the ion flight path, thereby mitigating path length difference effects,
   wherein the at least one curve defines an average radius of curvature, wherein the shape, electrical potential, and/or position of the aperture of the second electrode different from that of the aperture of the first electrode causes the ions to oscillate between inside the average radius of curvature and outside the average radius of curvature, so as to correct a difference in flight path length between ions entering the ion guide at a position inside the average radius of curvature and ions entering the ion guide at a position outside the average radius of curvature.

2. The ion guide of claim 1, wherein the direction perpendicular to the direction of the continuous ion flight path is defined by a helical shape, the direction of the ion flight path being an axis of the helical shape.

3. The ion guide of claim 1, wherein the aperture of the first electrode and the aperture of the second electrode each comprise a respective first slot and a respective second slot, each first slot being distinct and separated from the respective second slot;
   wherein the first slot of the aperture of the second electrode has a shape and/or position different from the first slot of the aperture of the first electrode so as to cause ions travelling along the ion flight path to shift in a first direction perpendicular to the direction of the ion flight path; and
   wherein the second slot of the aperture of the second electrode has a shape and/or position different from the second slot of the aperture of the first electrode so as to cause ions travelling along the ion flight path to shift in a second direction perpendicular to the direction of the ion flight path.

4. The ion guide of claim 3, wherein each first slot and each second slot have a shape defined by respective portions of the same rectangle.

5. The ion guide of claim 1, wherein the aperture of the first electrode and the aperture of the second electrode each comprise a ring shape.

6. The ion guide of claim 5, wherein the first electrode and the second electrode both include one or more penetrating nodules that extend into the respective aperture.

7. The ion guide of claim 1, wherein the aperture of the first electrode and the aperture of the second electrode each further comprise one or more vanes or nodules protruding from a side of the respective aperture that shift rotationally between the first and second electrodes.

8. The ion guide of claim 1, wherein the aperture of the first electrode and the aperture of the second electrode each comprise a wide or straight slot and wherein the slot shifts rotationally between the first and second electrodes.

9. The ion guide of claim 1, wherein the ion flight path has a spiral-based or helical-based shape.

10. The ion guide of claim 9, wherein the shift of ion motion in the direction perpendicular to the direction of the ion flight path causes ions to travel along a further helical shape with respect to the ion flight path.

11. A method of guiding ions, comprising:
    injecting ions into an ion guide comprising a plurality of electrodes, each electrode comprising at least one aperture so as to define an ion flight path having at least one curve, the at least one curve defining an average radius of curvature;
    passing the ions through an aperture of a first electrode of the plurality of electrodes along the ion flight path;
    shifting the ions in a direction perpendicular to a direction of the ion flight path by passing the ions through an aperture of a second electrode of the plurality of electrodes, the aperture of the second electrode being adjacent to the aperture of the first electrode, the aperture of the second electrode having a shape, electrical potential, and/or position different from that of the aperture of the first electrode, the ions traveling along different parts of the at least one curve of the ion flight path thereby mitigating path length difference effects; and
    oscillating the ions between inside the average radius of curvature and outside the average radius of curvature by passing the ions through the second aperture, the oscillation correcting a difference in flight path length between ions entering the ion guide at a position inside the average radius of curvature and ions entering the ion guide at a position outside the average radius of curvature.

12. The method of claim 11, wherein the direction perpendicular to the direction of the continuous ion flight path is defined by a helical shape, the direction of the ion flight path being an axis of the helical shape.

13. The method of claim 11, wherein the aperture of the first electrode and the aperture of the second electrode each comprise a respective first slot and a respective second slot, each first slot being distinct and separated from the respective second slot, the method further comprising:
    shifting ions travelling along the ion flight path in a first direction perpendicular to the direction of the ion flight path by passing the ions through the first slot of the aperture of the second electrode having a shape and/or position different from the first slot of the aperture of the first electrode; and
    shifting ions travelling along the ion flight path in a second direction perpendicular to the direction of the ion flight path by passing the ions through the second slot of the aperture of the second electrode having a shape and/or position different from the second slot of the aperture of the first electrode.

14. The method of claim 11, wherein the aperture of the first electrode and the aperture of the second electrode each comprise a ring shape.

15. The method of claim 11, wherein the aperture of the first electrode and the aperture of the second electrode each further comprise one or more vanes or nodules protruding from a side of the respective aperture that shift rotationally between the first and second electrodes.

16. The method of claim 11, wherein the aperture of the first electrode and the aperture of the second electrode each comprise a wide or straight slot and wherein the slot shifts rotationally between the first and second electrodes.

17. The method of claim 11, wherein the ion flight path has a spiral-based or helical-based shape.

18. The method of claim 17, wherein shifting the ions in the direction perpendicular to the direction of the ion flight path causes ions to travel along a further helical shape with respect to the ion flight path.

19. An ion guide comprising a plurality of electrodes, each electrode comprising at least one aperture, so as to define an ion flight path having at least one curve, wherein:
 an aperture of a first electrode of the plurality of electrodes is adjacent to an aperture of a second electrode of the plurality of electrodes along the ion flight path; and
 the aperture of the second electrode has a shape, electrical potential, and/or position different from that of the aperture of the first electrode so as to cause ions travelling along the ion flight path to shift in a direction perpendicular to a direction of the ion flight path, such that the ions travel along different parts of the at least one curve of the ion flight path, thereby mitigating path length difference effects,
 wherein the aperture of the first electrode and the aperture of the second electrode each comprise a respective first slot and a respective second slot, each first slot being distinct and separated from the respective second slot,
 wherein the first slot of the aperture of the second electrode has a shape and/or position different from the first slot of the aperture of the first electrode so as to cause ions travelling along the ion flight path to shift in a first direction perpendicular to the direction of the ion flight path, and
 wherein the second slot of the aperture of the second electrode has a shape and/or position different from the second slot of the aperture of the first electrode so as to cause ions travelling along the ion flight path to shift in a second direction perpendicular to the direction of the ion flight path.

* * * * *